US012536992B2

(12) United States Patent
Lee et al.

(10) Patent No.: US 12,536,992 B2
(45) Date of Patent: Jan. 27, 2026

(54) ELECTRONIC DEVICE AND METHOD FOR PROVIDING VOICE RECOGNITION SERVICE

(71) Applicant: SAMSUNG ELECTRONICS CO., LTD., Suwon-si (KR)

(72) Inventors: Hojung Lee, Suwon-si (KR); Hyungtak Choi, Suwon-si (KR); Munjo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 17/575,195

(22) Filed: Jan. 13, 2022

(65) Prior Publication Data

US 2022/0301549 A1 Sep. 22, 2022

Related U.S. Application Data

(63) Continuation of application No. PCT/KR2021/016882, filed on Nov. 17, 2021.

(30) Foreign Application Priority Data

Mar. 17, 2021 (KR) ........................ 10-2021-0034865

(51) Int. Cl.
*G10L 15/08* (2006.01)
*G06F 3/04842* (2022.01)
*G06F 3/16* (2006.01)

(52) U.S. Cl.
CPC .......... *G10L 15/08* (2013.01); *G06F 3/04842* (2013.01); *G06F 3/167* (2013.01); *G10L 2015/088* (2013.01)

(58) Field of Classification Search
CPC ................. G10L 15/08; G10L 15/1815; G10L 2015/088; G06F 3/04842; G06F 3/167
See application file for complete search history.

(56) References Cited

U.S. PATENT DOCUMENTS 8,126,715 B2    2/2012 Paek
9,129,011 B2 *  9/2015 Yang ..................... G06F 3/167
(Continued)

FOREIGN PATENT DOCUMENTS

CN    109545223 A    3/2019
JP    2016-519377 A    6/2016
(Continued)

OTHER PUBLICATIONS

International Search Report and Written Opinion (PCT/ISA/210, PCT/ISA/220, and PCT/ISA/237) issued Feb. 21, 2022 by the International Searching Authority in International Application No. PCT/KR2021/016882.
(Continued)

*Primary Examiner* — Paras D Shah
*Assistant Examiner* — Nadira Sultana
(74) *Attorney, Agent, or Firm* — Sughrue Mion, PLLC

(57) ABSTRACT

A method and an electronic device for providing a voice recognition service are provided. The method includes: receiving a voice command of a user while one or more objects are displayed on a screen of the electronic device; based on the receiving the voice command, identifying the one or more objects displayed on the screen; interpreting text converted from the voice command, based on types of the one or more objects; and performing an operation related to an object selected from among the one or more objects, based on a result of interpreting the text, wherein the types of the one or more objects are identified based on whether the one or more objects are selectable by a user input to the electronic device.

13 Claims, 17 Drawing Sheets

(56) References Cited

U.S. PATENT DOCUMENTS

| | | | |
|---|---|---|---|
| 9,171,542 B2 | 10/2015 | Gandrabur et al. | |
| 9,761,225 B2 | 9/2017 | Gandrabur et al. | |
| 9,927,949 B2 | 3/2018 | Gray et al. | |
| 10,068,574 B2* | 9/2018 | Zhang | G10L 15/1815 |
| 10,331,312 B2* | 6/2019 | Napolitano | G06F 16/45 |
| 10,600,413 B2 | 3/2020 | Zhang et al. | |
| 10,757,148 B2* | 8/2020 | Nelson | H04L 65/4015 |
| 10,884,701 B2* | 1/2021 | Thangarathnam | G06F 3/167 |
| 11,355,098 B1* | 6/2022 | Zhong | H04L 43/0829 |
| 11,392,688 B2* | 7/2022 | Lewis | G06F 21/53 |
| 11,429,344 B1* | 8/2022 | Fernandez | H04L 12/12 |
| 11,720,324 B2* | 8/2023 | Kim | G06V 30/412 |
| | | | 715/727 |
| 11,726,806 B2* | 8/2023 | Kim | G06F 9/454 |
| | | | 715/703 |
| 2014/0270258 A1* | 9/2014 | Wang | G06F 3/167 |
| | | | 381/110 |
| 2015/0317979 A1 | 11/2015 | Yang et al. | |
| 2015/0348551 A1* | 12/2015 | Gruber | G10L 15/1822 |
| | | | 704/235 |
| 2020/0260127 A1 | 8/2020 | Chung et al. | |
| 2021/0118463 A1 | 4/2021 | Chung et al. | |
| 2021/0280195 A1* | 9/2021 | Srinivasan | G06F 3/167 |
| 2021/0311701 A1* | 10/2021 | Cubukcu | G10L 15/22 |
| 2021/0383794 A1* | 12/2021 | Kim | G06F 3/167 |
| 2022/0254333 A1* | 8/2022 | Aliev | G06F 16/65 |

FOREIGN PATENT DOCUMENTS

| | | |
|---|---|---|
| KR | 10-2015-0072608 A | 6/2015 |
| KR | 10-2015-0072625 A | 6/2015 |
| KR | 10-2015-0125464 A | 11/2015 |
| KR | 10-1660269 B1 | 9/2016 |
| KR | 10-2018-0061691 A | 6/2018 |
| KR | 10-2009316 A | 8/2019 |

OTHER PUBLICATIONS

Junki Ohmura et al., "Context-Aware Dialog Re-Ranking for Task-Oriented Dialog Systems", arXiv:1811.11430v1, Nov. 28, 2018, 8 pages total.

Yue Weng et al., "Joint Contextual Modeling for ASR Correction and Language Understanding", arXiv:2002.00750v1, IEEE, Jan. 28, 2020, 7 pages total.

* cited by examiner

FIG. 1
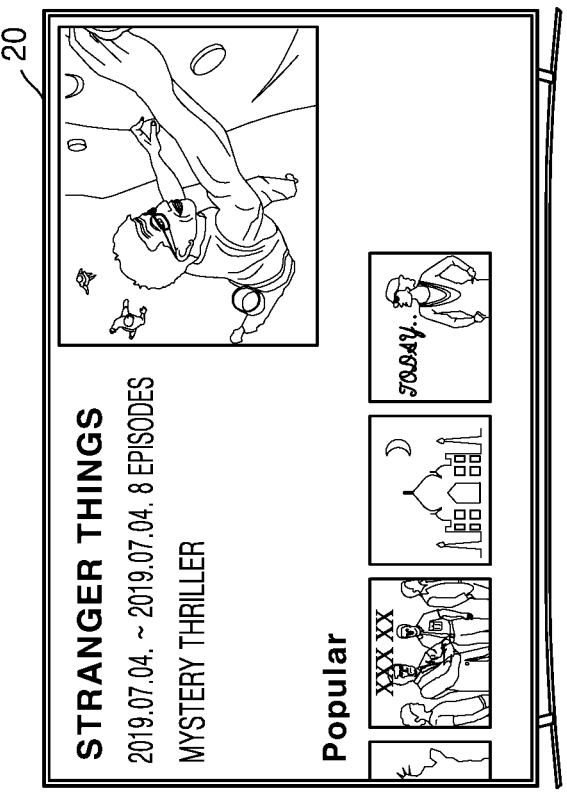
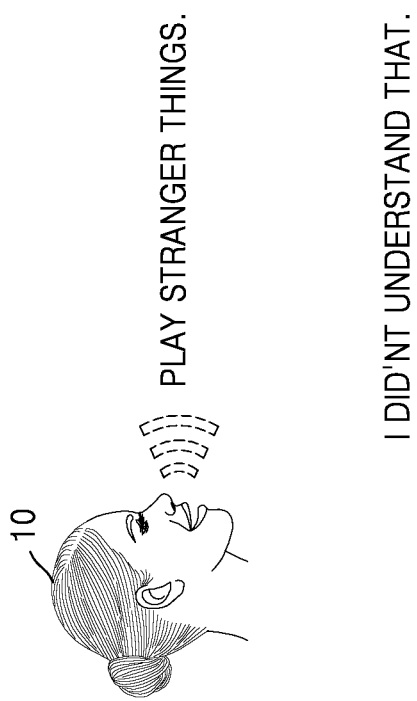

FIG. 7

| SCREEN CONTENT ATTRIBUTE / UTTERANCE INTENT ATTRIBUTE | | SELECTABLE | | NON-SELECTABLE | |
|---|---|---|---|---|---|
| | | TEXT | INTERPRETABLE | TEXT | INTERPRETABLE |
| ACTIONABLE | SHOW, PLAY, EXECUTE | 1 | 2 | 3 | 4 |
| ACCESSIBLE | READ, ENLARGE | 2 | 4 | 1 | 3 |

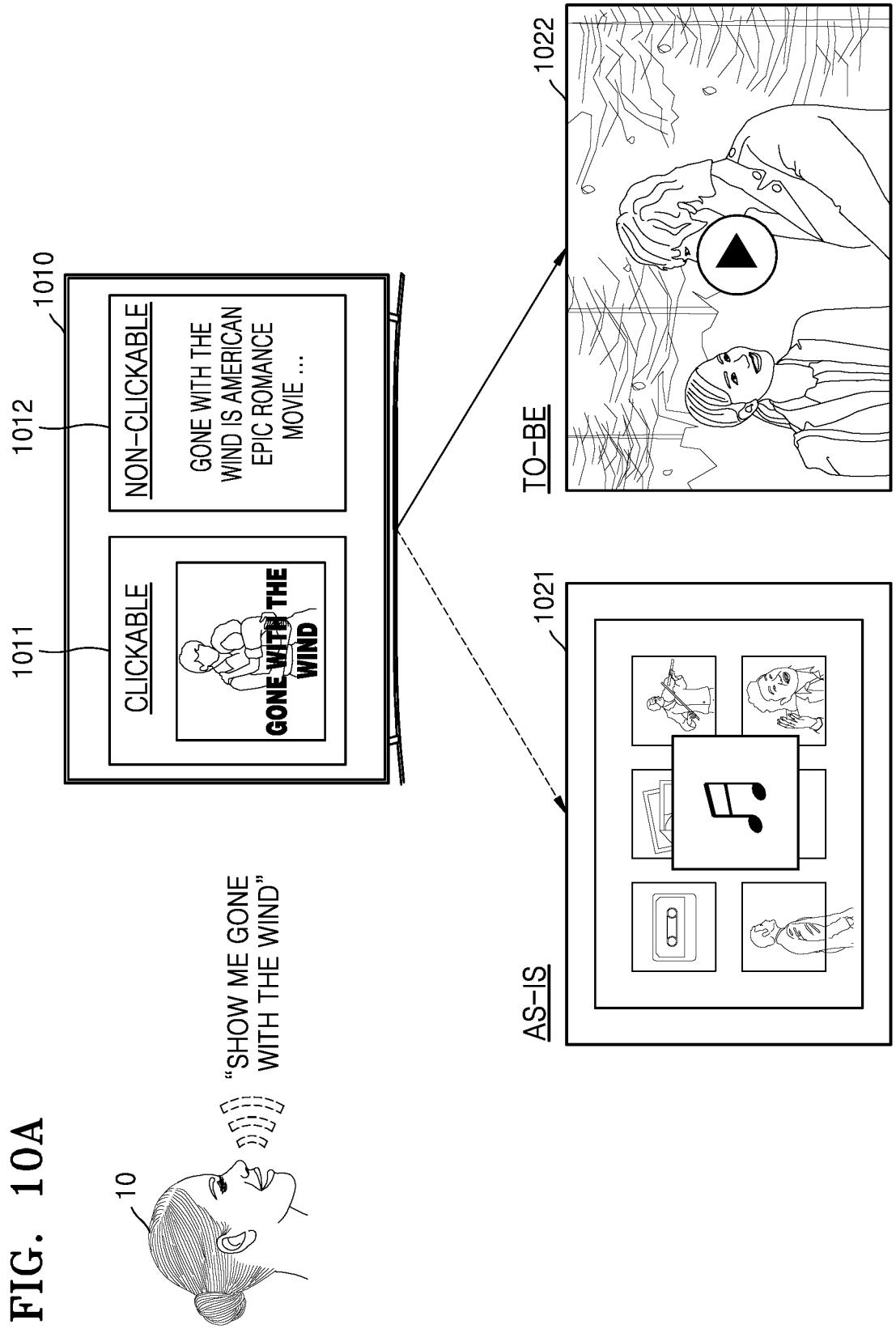

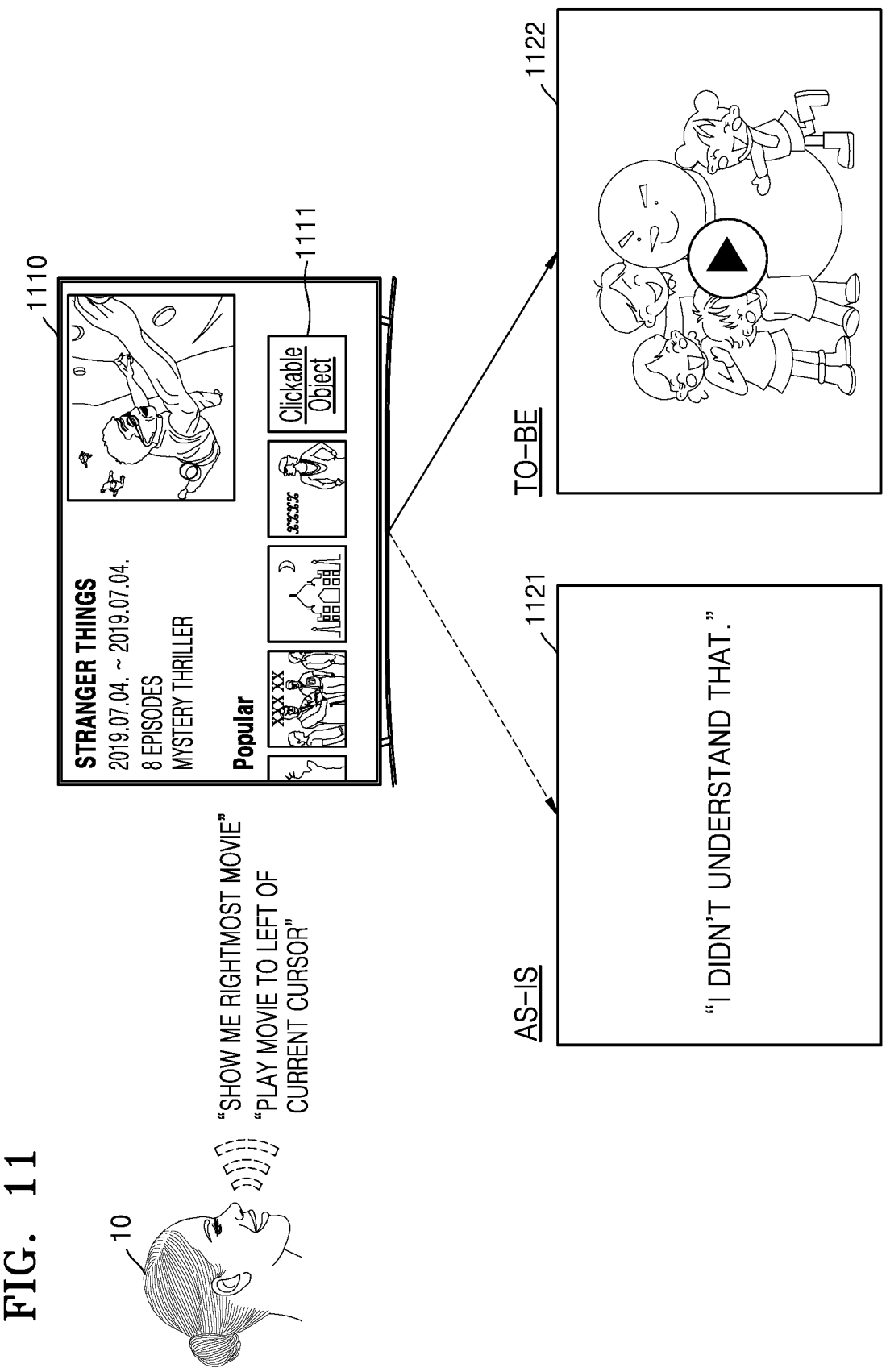

ELECTRONIC DEVICE AND METHOD FOR PROVIDING VOICE RECOGNITION SERVICE

CROSS-REFERENCE TO RELATED APPLICATION(S)

This application is a bypass continuation of International PCT Application No. PCT/KR2021/016882, filed on Nov. 17, 2021, which is based on and claims priority to Korean Patent Application No. 10-2021-0034865, filed on Mar. 17, 2021 in the Korean Intellectual Property Office, the disclosures of which are incorporated by reference herein in their entirety.

BACKGROUND

1. Field

The disclosure relates to an electronic device and a method for providing a voice recognition service, and more particularly, to an electronic device and a method for providing a voice recognition service based on contents displayed on a screen.

2. Description of Related Art

Recently, with the development of electronic devices that perform various functions in a complex manner, such as smart phones, electronic devices capable of voice recognition have been released on the market to improve operability.

A voice recognition technique refers to a technique in which an electronic device such as a computer automatically recognizes the meaning of a voice command uttered by a user. For example, the voice recognition technique may facilitate execution of various functions of an electronic device such as a smart speaker, a smart phone, a computer, a personal digital assistant (PDA), a portable multimedia player (PMP), a smart home appliance, a navigation device, a wearable device, etc., without a user's manipulation of a button or contact on a touch screen.

Moreover, along with the development of artificial intelligence (AI) technology, AI technology has been incorporated into voice recognition functions, enabling quick and accurate voice recognition with respect to various utterances. An AI system is a computer system that implements human-level intelligence, and allows a machine to learn, make decisions, and become smarter, by itself, unlike an existing rule-based smart system. The more the AI system is used, the greater its recognition rate and the more accurately the AI system understands users' preferences. As a result, existing rule-based smart systems have been gradually replaced by deep-learning-based AI systems.

Generally, a voice recognition technique may have poor performance in recognizing a user's utterance related to data that has not been sufficiently trained, such as a name of new content or a function of a newly installed application. Thus, there is a need for a technique to accurately recognize a user's utterance intent associated with a function of an application currently used by the user or a function on a screen currently viewed by the user and perform an operation corresponding to the user's utterance intent.

SUMMARY

In accordance with an aspect of the disclosure, there is provided a method, performed by an electronic device, of providing a voice recognition service. The method includes: receiving a voice command of a user while one or more objects are displayed on a screen of the electronic device; based on the receiving the voice command, identifying the one or more objects displayed on the screen; interpreting text converted from the voice command, based on types of the one or more objects; and performing an operation related to an object selected from among the one or more objects, based on a result of interpreting the text, wherein the types of the one or more objects are identified based on whether the one or more objects are selectable by a user input to the electronic device.

The method may further include: generating a data structure related to the one or more objects, the data structure being used to interpret the voice command. The generating the data structure related to the one or more objects includes: identifying the types of the one or more objects through character recognition based on image processing with respect to the one or more objects or through meta data reading with respect to an application that provides the one or more objects; determining priorities of the one or more objects, based on the types of the one or more objects; and generating the data structure in a tree form indicating a relationship between the one or more objects and terms related to the one or more objects.

The terms related to the one or more objects may be obtained from at least one of text information included in the one or more objects or attribute information of the one or more objects included in meta data of the application that provides the one or more objects.

The one or more objects may include at least one of image information or text information, the image information is displayed on an object layer of the screen, the text information is displayed on a text layer of the screen, and the types of the one or more objects are identified based on the object layer and the text layer.

The identifying the types of the one or more objects may include identifying whether the one or more objects are selectable or non-selectable by the user input to the electronic device or whether the one or more objects include text information.

The method may further include: generating a data structure related to the one or more objects, the data structure being used to interpret the voice command, wherein the identifying the one or more objects displayed on the screen based on the voice command includes: determining a type of an utterance intent of the user from the text converted from the voice command; and determining priorities of the one or more objects of the data structure, based on the type of the utterance intent and the types of the one or more objects.

The method may further include: obtaining the text from the voice command; determining a type of an utterance intent of the user from the text; and determining whether to operate in a first mode or in a second mode, based on the type of the utterance intent, wherein, in the first mode, the electronic device performs natural language understanding on the text based on a data structure generated based on the types of the one or more objects displayed on the screen in the first mode, and in the second mode, the electronic device performs the natural language understanding on the text without using the data structure generated based on the types of the one or more objects.

The method may further include: obtaining the text from the voice command; and determining whether to operate in a first mode or in a second mode, based on whether an activation word is included in the text, wherein, in the first mode, the electronic device performs natural language understanding on the text based on a data structure generated based on the types of the one or more objects displayed on the screen, and in the second mode, the electronic device performs the natural language understanding on the text without using the data structure generated based on the types of the one or more objects.

The result of interpreting the text may include information about at least one of an utterance intent of the user determined based on the text converted from the voice command, the object selected from among the one or more objects, or a function to be executed by the electronic device in relation to the selected object.

The operation related to the object selected from among the one or more objects may include at least one of an operation of playing a video related to the selected object, an operation of enlarging and displaying an image or text related to the selected object, or an operation of outputting an audio based on the text included in the selected object.

The performing the operation related to the object selected from among the one or more objects may include generating and outputting a response message related to the selected object, based on the voice command of the user.

In accordance with an aspect of the disclosure, there is provided an electronic device for providing a voice recognition service, the electronic device including: a display; a microphone; a memory storing one or more instructions; and at least one processor configured to execute one or more instructions stored in the memory to: receive a voice command of a user via the microphone while one or more objects are displayed on a screen of the display; based on receiving the voice command, identify the one or more objects displayed on the screen; interpret text converted from the voice command, based on types of the one or more objects; and perform an operation related to an object selected from among the one or more objects, based on a result of interpreting the text, wherein the types of the one or more objects are identified based on whether the one or more objects are selectable by a user input to the electronic device.

The at least one processor may be further configured to: generate a data structure related to the one or more objects, the data structure being used to interpret the voice command; and identify the types of the one or more objects through character recognition based on image processing with respect to the one or more objects or through meta data reading with respect to an application that provides the one or more objects, and determine priorities of the one or more objects, based on the types of the one or more objects, to generate the data structure in a tree form indicating a relationship between the one or more objects and terms related to the one or more objects.

The at least one processor may be further configured to identify the types of the one or more objects by identifying whether the one or more objects are selectable or non-selectable by the user input to the electronic device or whether the one or more objects include text information.

The at least one processor may be further configured to: generate a data structure related to the one or more objects, the data structure being used to interpret the voice command; determine a type of an utterance intent of the user from the text converted from the voice command; and determine the priorities of the one or more objects of the data structure, based on the type of the utterance intent and the types of the one or more objects, to identify the one or more objects displayed on the screen, based on receiving the voice command.

The at least one processor may be further configured to: obtain the text from the voice command; determine a type of an utterance intent of the user from the text; and determine whether to operate in a first mode or in a second mode, based on the type of the utterance intent, and in the first mode, the electronic device performs natural language understanding with respect to the text based on a data structure generated based on the types of the one or more objects displayed on the screen, and in the second mode, the electronic device performs the natural language understanding on the text without using the data structure generated based on the types of the one or more objects.

The at least one processor may be further configured to: obtain the text from the voice command; and determine whether to operate in a first mode or in a second mode, based on whether an activation word is included in the text, and in the first mode, the electronic device performs natural language understanding on the text based on a data structure generated based on the types of the one or more objects displayed on the screen, and in the second mode, the electronic device performs the natural language understanding on the text without using the data structure generated based on the types of the one or more objects.

The operation related to the object selected from among the one or more objects may include at least one of an operation of playing a video related to the selected object, an operation of enlarging and displaying an image or text related to the selected object, or an operation of outputting an audio based on the text included in the selected object.

In accordance with an aspect of the disclosure, there is provided a server for providing a voice recognition service through an electronic device including a display. The server includes: a communication interface configured to communicate with the electronic device; a memory storing one or more instructions; and at least one processor configured to execute one or more instructions stored in the memory to: receive information about a voice command of a user received through the electronic device while one or more objects are displayed on a screen of the electronic device; identify the one or more objects displayed on the screen, based on receiving the voice command; interpret text converted from the voice command, based on types of the one or more objects; and control the electronic device to perform an operation related to an object selected from among the one or more objects, based on a result of interpreting the text, wherein the types of the one or more objects are identified based on whether the one or more objects are selectable by a user input to the electronic device.

BRIEF DESCRIPTION OF THE DRAWINGS

FIG. 1 shows a case where a general electronic device fails to understand a user's voice command.

FIG. 7 shows an example of a priority determined by an electronic device for an object, according to an embodiment of the disclosure.

FIG. 10A shows examples of a voice recognition result provided by a general electronic device in response to a user's voice command, and a voice recognition result provided by an electronic device according to an embodiment of the disclosure in response to a user's voice command.

FIG. 11 shows examples of a voice recognition result provided by a general electronic device in response to a user's voice command, and a voice recognition result provided by an electronic device according to an embodiment of the disclosure in response to a user's voice command.

DETAILED DESCRIPTION

Figure 2:
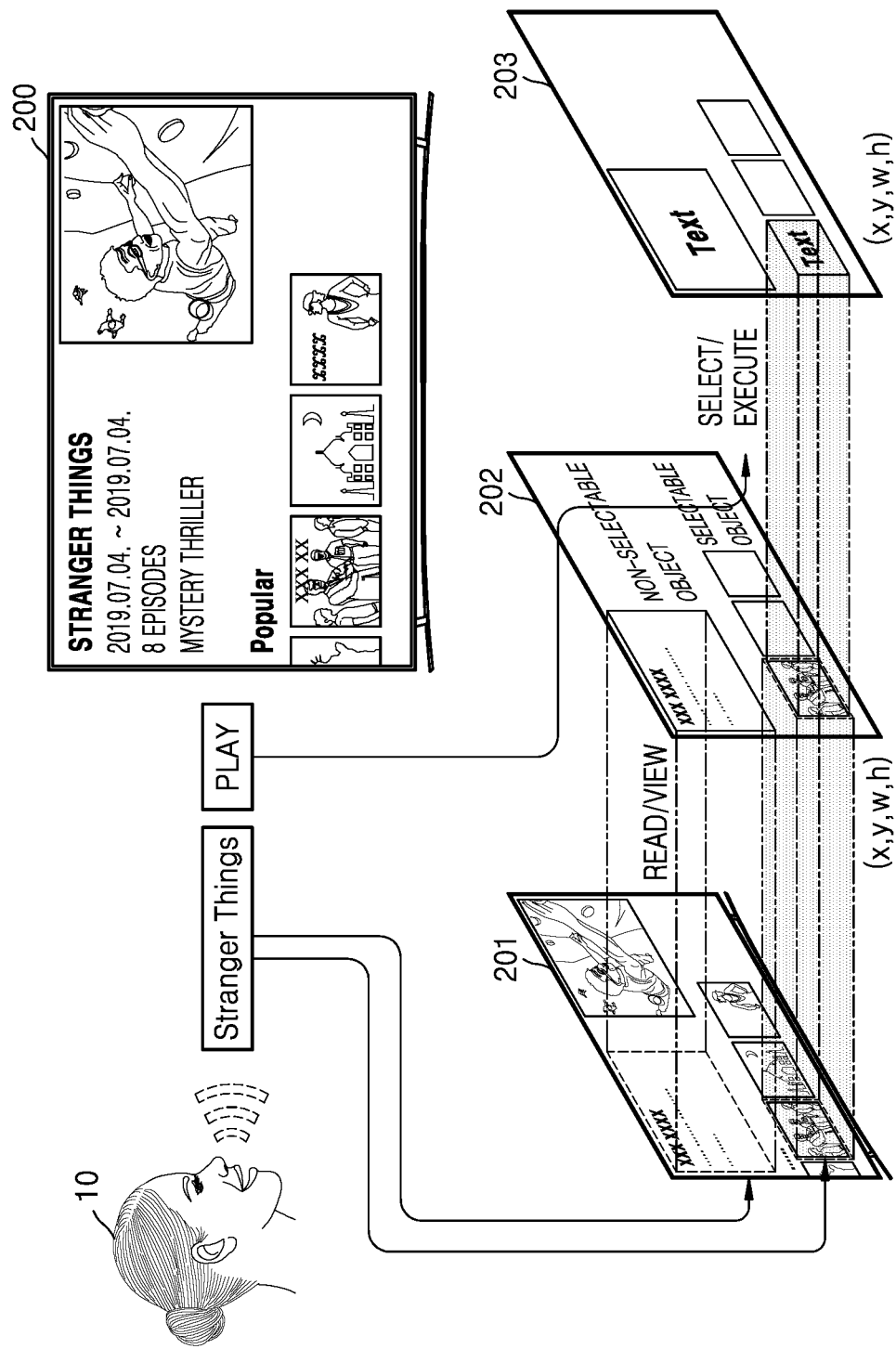
FIG. 2 is a view for describing a method, performed by an electronic device, of providing a voice recognition service regarding a user's voice command, based on an object displayed on a screen, according to an embodiment of the disclosure.

Throughout the disclosure, the expression "at least one of a, b or c" indicates only a, only b, only c, both a and b, both a and c, both b and c, or all of a, b, and c.

Hereinafter, embodiments of the disclosure will be described in detail with reference to the accompanying drawings to allow those of ordinary skill in the art to easily carry out the embodiments of the disclosure. However, the embodiments of the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

In the description of the embodiments of the disclosure, when a part is "connected" to another part, the part is not only "directly connected" to another part but also "electrically connected" to another part with another device intervening in them. When it is assumed that a certain part includes a certain component, the term "including" means that a corresponding component may further include other components unless a specific meaning opposed to the corresponding component is written.

In the disclosure, a voice recognition service may be a service through which an electronic device, a server, etc., may automatically recognize a meaning of a voice command uttered by a user and provide various functions based on a recognition result. For example, with the voice recognition service, the user may control an operation of the electronic device or be provided with a response message from the electronic device as if directly conversing with the electronic device, through a voice command.

Hereinafter, the disclosure will be described with reference to the accompanying drawings.

FIG. 1 shows a case where a general electronic device fails to understand a user's voice command.

A general electronic device 20 that provides a voice recognition service may execute an application based on a voice command of a user 10. However, after loading of an execution screen of the application, the general electric device 20 may not support a voice recognition function associated with the loaded screen. For example, when the electronic device 20 executes an application, an execution screen displaying a function related to content in the form of text, an image, etc., may be loaded. In this case, the electronic device 20 may not be able to support recognition of a voice command related to the function displayed on the execution screen. Thus, the disclosure is provided to solve a problem in which the general electronic device 20 providing a voice recognition service is not able to support a voice recognition function associated with the screen.

In addition, the general electronic device 20 that provides a voice recognition service may have poor performance in recognizing a user's voice command related to data that has not been sufficiently trained, such as a name of new content or a function of a newly installed application. However, for improvement of voice recognition performance, it may be difficult to learn every new data such as the name of the new content or the function of the newly installed application, due to resource constraints.

Consequently, there is a need to develop a technique for mapping a user's voice command or a voice recognition result of the voice command to a function of an application so that an electronic device providing a voice recognition service may accurately recognize a continuous voice command of the user on a screen provided to the user. For example, the function of the application mapped to the voice command may be expressed in the form of an application programming interface (API). Mapping between the voice command (or the voice recognition result of the voice command) and the function of the application may be expressed in the form of a logic code or a lookup table implemented to call the API based on the voice command (or the voice recognition result of the voice command).

FIG. 2 is a view for describing a method, performed by an electronic device, of providing a voice recognition service regarding a user's voice command, based on an object displayed on a screen, according to an embodiment of the disclosure.

An electronic device 200 according to an embodiment of the disclosure may be a display, such as a television (TV), a smart phone, etc. When the electronic device 200 according to an embodiment of the disclosure receives a voice command uttered by a user 10, the electronic device 200 may interpret the user's voice command based on text currently displayed on the screen and an output layer constituting the screen. For example, the electronic device 200 may interpret the user's voice command based on at least one of contents or a position of the text currently displayed on the screen.

To accurately understand a user's voice command associated with a function provided on an execution screen of an application, the electronic device 200 according to an embodiment of the disclosure may analyze an object displayed on the execution screen.

The object may be information provided in the form of text, an image, etc., to the user on the execution screen of the application, provided to allow the user to select a function of the application based on the information (e.g., text information, image information, meta data, etc.). For example, the object may include at least one of text displayed in a region of the screen or an image, an icon, or a menu displayed in a region of the screen.

According to an embodiment of the disclosure, the electronic device 200 may generate a data structure including information about objects by using meta data regarding an application and a character recognition result based on image processing with respect to the screen. An operating system (OS) of the electronic device 200 may use the generated data structure to interpret a user's voice command.

According to an embodiment of the disclosure, the electronic device 200 may define and store the data structure including the information about the objects in a form that may be searched and arranged. For example, the form of the data structure may include a graph, a lookup table, a linked list, or a tree.

As shown in FIG. 2, a screen 201 of the electronic device 200 according to an embodiment of the disclosure may be divided into an object layer 202 and a text layer 203. The object layer 202 may include information about a selectable object and a non-selectable object that are displayed on the screen 201. The text layer 203 may include information about text content displayed on the screen, text content recognized through character recognition from an image displayed on the screen, or text content recognized from metadata of an object. A type of an object may be identified based on the object layer 202 and the text layer 203.

The electronic device 200 according to an embodiment of the disclosure may determine whether an object is of a selectable type or a non-selectable type, or of a text type or an interpretable type. The selectable type may mean a type of an object that is selectable on a displayed user interface, and the non-selectable type may mean a type of a fixed object that is not selectable. Here, the term "selectable" may mean that an object may be selected by a user through various types of commands (e.g., an audio command, a touch command, etc.) to perform a function associated with the object. In addition, the text type may mean a type of an object including text information, and the interpretable type may mean a type of an object including an image from which text is extracted or which is interpretable through screen recognition based on image processing, through meta data, etc. The interpretable type may or may not include text information. The interpretable object may be referred to as a non-text object, an image object, etc.

The electronic device 200 according to an embodiment of the disclosure may generate a data structure related to one or more objects displayed on a screen, for use in interpretation of a voice command. Based on receipt of a voice command uttered by the user 10, when a certain condition is satisfied, the electronic device 200 may interpret the voice command according to priorities of objects included in a previously generated data structure and perform a corresponding operation.

For example, a user's utterance intent may be of a certain type (e.g., an actionable type to select or execute a function provided by the electronic device 200 or an accessible type to access information provided by the electronic device 200), and there may be a data structure related to one or more objects, which is previously generated for interpretation of a voice command. In this case, the electronic device 200 may determine that the user's utterance intent is to execute a function provided in an execution screen of an application.

On the other hand, when the utterance intent is not of a certain type or the data structure related to one or more objects does not exist, the electronic device 200 may perform general natural language understanding without analyzing an object displayed on the screen.

As shown in FIG. 2, assuming that a voice command "Play Stranger Things" uttered by the user 10 is received, the electronic device 200 may determine based on a part "Play" of the voice command that the type of the utterance intent of the user 10 is an actionable type. In addition, when "Stranger Things" is a name of content related to (or close to) a selectable object currently displayed on the screen, the electronic device 200 may determine that the voice command of the user 10 instructs to play the content. The electronic device 200 may generate an action function that performs a certain function regarding a selectable object (e.g., call of an API that performs the certain function, generation of Event ID mapped to the certain function, etc.), based on a determination result.

Figure 3A:
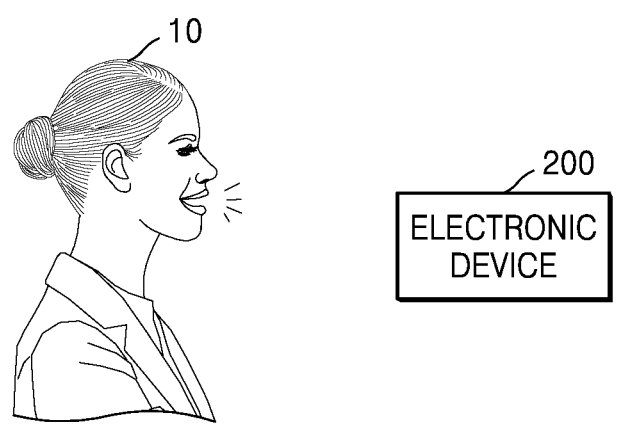
FIG. 3A shows an example of a voice recognition system according to an embodiment of the disclosure.

FIG. 3A shows an example of a voice recognition system according to an embodiment of the disclosure.

As shown in FIG. 3A, the electronic device 200 according to an embodiment of the disclosure alone may provide a voice recognition service to the user 10. For example, the electronic device 200 may be, for example, but not limited to, a home appliance such as a television (TV), a refrigerator, a washing machine, etc., a smart phone, a personal computer (PC), a wearable device, a personal digital assistant (PDA), a media player, a micro server, a global positioning system (GPS) device, an electronic book (e-book) terminal, a digital broadcasting terminal, a navigation system, a kiosk, an MP3 player, a digital camera, and other mobile or non-mobile computing devices.

The electronic device 200 according to an embodiment of the disclosure may receive a voice command of the user 10 and interpret the received voice command based on at least one object displayed on the screen. The electronic device 200 may perform a certain operation or generate and output a response message, based on an interpretation result.

Figure 3B:
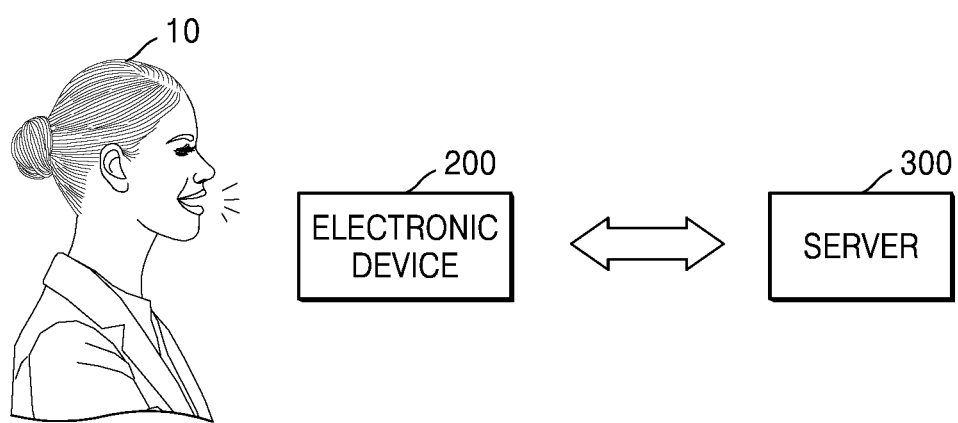
FIG. 3B shows an example of a voice recognition system according to an embodiment of the disclosure.

In addition, as shown in FIG. 3B, the electronic device 200 according to an embodiment of the disclosure may provide the voice recognition service by communicating with another electronic device such as a server 300. The electronic device 200 and the server 300 may be wiredly or wirelessly connected to each other.

The server 300 may share data, a resource, and a service with the electronic device 200 or perform control, file management, monitoring of the entire network, etc., on the electronic device 200. The electronic device 200 may perform a certain operation or output a response message, for the user's voice command, through communication with the server 300.

The electronic device 200 according to an embodiment of the disclosure may receive the voice command of the user 10 and transmit information related to the voice command to the server 300. The "information related to the voice command" may include an audio signal including the voice command or may include a feature vector extracted from the voice command or text converted from the voice command. The server 300 according to an embodiment of the disclosure may interpret the voice command of the user 10, based on at least one object displayed on the screen of the electronic device 200 and the information related to the voice command received from the electronic device 200. The server 300 may control the electronic device 200 to perform the certain operation or output the response message, by transmitting a result of interpreting the voice command to the electronic device 200.

As shown in FIGS. 3A and 3B, a system for providing a voice recognition service according to an embodiment of the disclosure may include at least one electronic device and/or a server. Herein below, for convenience, a description will be made as an example where an "electronic device" provides a voice recognition service in and of itself. However, the disclosure is not limited to the voice recognition service provided on-device, and some or all of operations of the electronic device described below may be performed by another electronic device and/or the server, connected to the electronic device.

Figure 4:
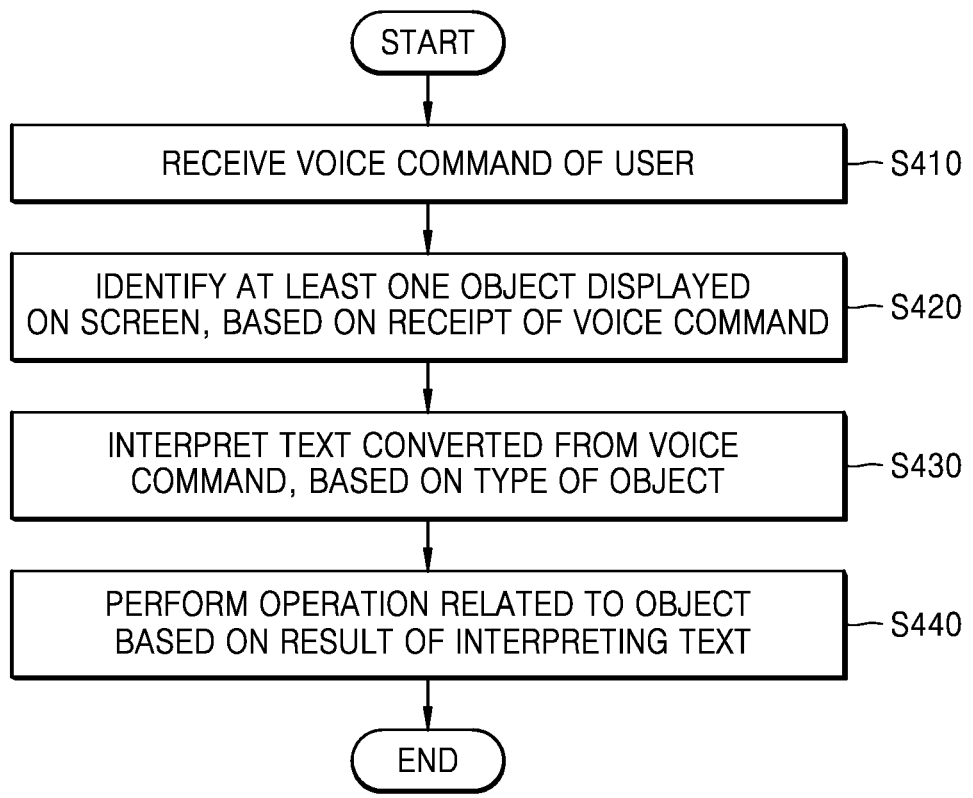
FIG. 4 is a flowchart of a method, performed by an electronic device, of providing a voice recognition service, according to an embodiment of the disclosure.

FIG. 4 is a flowchart of a method, performed by an electronic device, of providing a voice recognition service, according to an embodiment of the disclosure.

The electronic device 200 according to an embodiment of the disclosure may be an electronic device including a display showing one or more objects on a screen. The electronic device 200 may generate in advance a data structure related to one or more objects displayed on the screen for use in interpretation of the voice command.

The one or more objects displayed on the screen may include at least one of image information or text information. Image information of an object may be displayed on an object layer of the screen, and text information of the object may be displayed on a text layer of the screen. The electronic device 200 according to an embodiment of the disclosure may identify types of objects, based on the object layer and the text layer that constitute the screen.

For example, the electronic device 200 may identify a type of an object, based on whether the object is selectable or non-selectable by a user input to the electronic device 200 or whether the object includes or does not include text information.

The electronic device 200 according to an embodiment of the disclosure may identify a type of an object based on character recognition through image processing with respect to the object displayed on the screen or meta data reading with respect to an application that provides the object on the screen. Based on types of one or more objects displayed on the screen, the electronic device 200 may determine priorities of the one or more objects. The electronic device 200 may generate a data structure in which the one or more objects displayed on the screen have a hierarchical relationship according to the priorities.

In addition, the electronic device 200 according to an embodiment of the disclosure may obtain terms related to the objects, from at least one of text information included in the objects or attribute information of the objects, included in meta data of an application that provides the objects. According to an embodiment of the disclosure, the electronic device 200 may define and store the data structure including the information about the objects in a form that may be searched and arranged. For example, the form of the data structure may include a graph, a lookup table, a linked list, or a tree. For example, the electronic device 200 may generate, in the data structure where the one or more objects form the hierarchical relationship, a data structure in a tree form such that the respective objects and the terms related thereto have a horizontal relationship.

In operation S410, the electronic device 200 according to an embodiment of the disclosure may receive a voice command of a user when one or more objects are displayed on a screen of the electronic device 200.

The electronic device 200 according to an embodiment of the disclosure may obtain text from the received voice command and determine an utterance intent of the user by performing natural language understanding with respect to the text.

For example, the electronic device 200 may obtain the text from the voice command by using an end-to-end automatic voice recognition (ASR) model. The end-to-end automatic voice recognition scheme may refer to a voice recognition scheme using a deep neural network trained to derive one sentence through a deep learning engine upon recognition of voice data. Examples of the end-to-end automatic voice recognition model may include a recurrent neural network transducer (RNN-T) model, a connectionist temporal classification (CTC) model, etc.

In another example, the electronic device 200 may use a voice recognition scheme using an acoustic model, a dictionary, and a language model. In such a voice recognition scheme, in a process of converting voice into text, a process of finding a phoneme of the voice, a process of extracting a word based on the phoneme, and a process of finding a sentence may be configured with various modules. For example, the electronic device 200 may obtain a phoneme string from a voice signal by using the acoustic model, estimate words from the phoneme string based on the dictionary and the language model, and obtain text including the estimated words.

Once the text is obtained based on the estimated words from the received voice command, the electronic device 200 according to an embodiment of the disclosure may determine the user's intent to utter the voice command by analyzing the text through a natural language understanding model. The electronic device 200 may determine whether the utterance intent is of an actionable type or an accessible type. For example, when the electronic device 200 obtains text "Play Stranger Things", the electronic device 200 may determine that the user's utterance intent is to execute a function related to "Stranger Things" through the natural language understanding model. In another example, when the electronic device 200 obtains text "Enlarge Stranger Things", the electronic device 200 may determine that the user's utterance intent is to access information related to "Stranger Things" through the natural language understanding model.

In operation S420, the electronic device 200 according to an embodiment of the disclosure may identify the one or more objects displayed on the screen based on the received voice command of the user.

The electronic device 200 according to an embodiment of the disclosure may determine a type of the utterance intent of the user from the text converted from the voice command. The electronic device 200 may re-determine the priorities of the one or more objects of the data structure, based on the type of the utterance intent and the types of the one or more objects.

When the type of the utterance intent is a certain type (e.g., the actionable type or the accessible type) and a data structure regarding an object displayed on the screen exists, the electronic device 200 according to an embodiment of the disclosure may re-determine the priorities of the objects of the data structure. The electronic device 200 may assign different priorities to the types of the objects according to the type of the utterance intent. For example, when the user's utterance intent of the voice command is of the actionable type, the electronic device 200 may assign a priority to the type of the object such that a selectable object displayed on the screen may be preferentially referred to in voice recognition. In another example, when the user's utterance intent of the voice command is of the accessible type, the electronic device 200 may assign a priority to the type of the object such that a non-selectable object displayed on the screen may be preferentially referred to in voice recognition. A method of assigning different priorities to objects according to the type of the utterance intent will be described in detail later with reference to FIG. 7.

In operation S430, the electronic device 200 according to an embodiment of the disclosure may interpret the text converted from the voice command, based on the types of the one or more objects. The types of the one or more objects may be identified according to whether a corresponding object is selectable by a user input to the electronic device 200.

The electronic device 200 according to an embodiment of the disclosure may interpret the text by using a data structure in which a priority is assigned to an object according to a type of the object.

For example, when the utterance intent of the voice command of the user is of the actionable type, the electronic device 200 may interpret the text by preferentially referring to a selectable object assigned with a relatively high priority in the data structure. In another example, when the utterance intent of the voice command of the user is of the accessible type, the electronic device 200 may interpret the text by preferentially referring to a non-selectable object assigned with a relatively high priority in the data structure.

The electronic device 200 according to an embodiment of the disclosure may identify a part corresponding to the intent and a part corresponding to an entity from the text converted from the voice command, and interpret meanings of the identified intent and entity by referring to a data structure related to objects displayed on the screen. The intent may mean a text part related to an operation to be executed by the electronic device 200 in response to the voice command, like "Execute" and "Show", and the entity may mean a text part related to a target of the operation to be executed. The entity may include at least one of a word or a phrase having a particular meaning included in the text.

The electronic device 200 according to an embodiment of the disclosure may interpret user's intent based on a data structure related to objects displayed on the screen (or functions of an application provided on the screen), even when the intent of the text converted from the voice command of the user is not clear.

For example, when a screen including objects related to video playback is displayed, a voice command "Do Stranger Things" may be received. In this case, the electronic device 200 may determine that Do' instructs to play video, and may call a related API, e.g., an API for playing video related to 'Stranger Things'.

In addition, the electronic device 200 according to an embodiment of the disclosure may interpret an entity that is difficult to interpret in relation to new contents that are not learned, such as a movie title, a song title, a movie description, etc., based on a data structure related to objects (or meta data of the objects) displayed on the screen. The electronic device 200 may control the voice recognition model and the language recognition model to refer to information in a data structure configured on the screen, like a dictionary, to interpret at least one entity identified from the obtained text.

The electronic device 200 according to an embodiment of the disclosure may compare the entity identified in the text obtained from the voice command with objects displayed on the screen. The electronic device 200 may select an object having the highest degree of relation with the identified entity from among the objects displayed on the screen. The electronic device 200 may determine that the entity identified in the text indicates the selected object.

For example, when a screen including objects related to video playback is displayed, a voice command "Play Wife" may be received. In this case, even when the electronic device 200 has interpreted the word to be "Wi-Fi" from the received voice command, the electronic device 200 may accurately interpret "Wife" based on the movie title "Wife" included in an object displayed on the screen, without misrecognizing "Wife" as "Wi-Fi".

In operation S440, the electronic device 200 according to an embodiment of the disclosure may perform an operation related to the object selected from among the one or more objects, based on a result of interpreting the text.

The electronic device 200 according to an embodiment of the disclosure may derive, as the result of interpreting the text, information about at least one of an utterance intent of the user determined based on the text, the object selected from among the one or more objects displayed on the screen, or a function to be executed in relation to the object selected based on the utterance intent of the user.

The electronic device 200 according to an embodiment of the disclosure may perform, based on the result of interpreting the text, at least one of an operation of playing contents (e.g., audio, video, etc.) related to the object selected from among the one or more objects displayed on the screen, an operation of enlarging and displaying an image or text related to the selected object, or an operation of converting text included in the selected object into voice and outputting the voice.

The electronic device 200 according to an embodiment of the disclosure may generate and output a response message related to the object selected from among the one or more objects displayed on the screen, based on the result of interpreting the text.

The electronic device 200 according to an embodiment of the disclosure may generate in advance a data structure related to the one or more objects for use in interpretation of a voice command received during display of the one or more objects on the screen.

Figure 5:
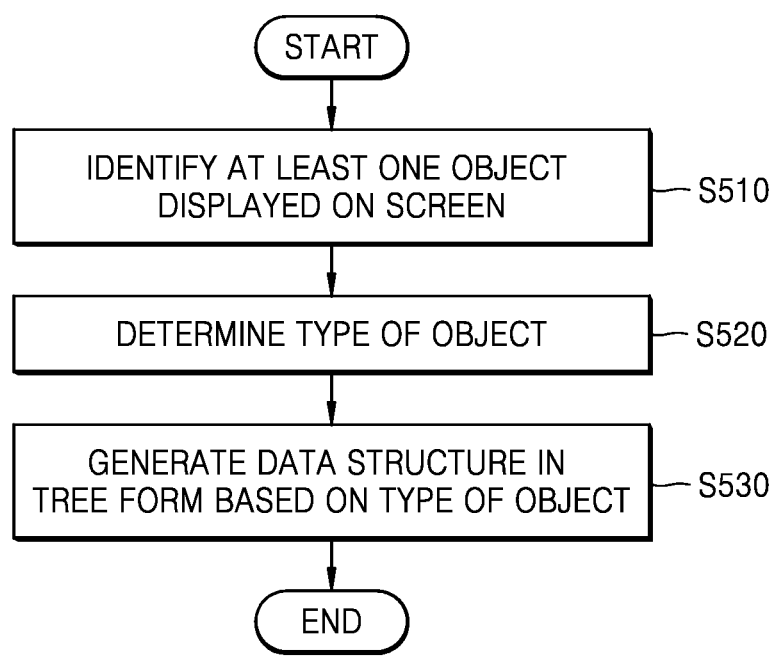
FIG. 5 is a flowchart of a method, performed by an electronic device, of generating a data structure regarding objects displayed on a screen, according to an embodiment of the disclosure.

FIG. 5 is a flowchart of a method, performed by an electronic device, of generating a data structure regarding objects displayed on a screen, according to an embodiment of the disclosure.

In operation S510, the electronic device 200 according to an embodiment of the disclosure may identify one or more objects displayed on the screen.

The electronic device 200 may identify or recognize (or read) a character through image processing with respect to an object displayed on the screen by using, for example, optical character recognition (OCR), etc., or identify text information included in the object, in order to recognize contents related to the object displayed on the screen. Alternatively or additionally, the electronic device 200 may recognize the contents displayed on the screen by reading meta data of an application that provides the one or more objects on the screen.

In operation S520, the electronic device 200 according to an embodiment of the disclosure may determine types of the identified one or more objects.

The electronic device 200 according to an embodiment of the disclosure may divide the screen into a plurality of layers. The electronic device 200 may display the one or more objects on the screen by overlapping the plurality of layers. For example, as shown in FIG. 2, the electronic device 200 may divide the screen 201 into the object layer 202 and the text layer 203. The screen 201 may be displayed such that the object layer 202 and the text layer 203 are overlapped in a single layer.

The electronic device 200 according to an embodiment of the disclosure may determine a type of an object by classifying image information and text included in the object, based on the plurality of layers. The electronic device 200 may determine whether one or more objects displayed on the object layer 202 are selectable objects or non-selectable objects.

The selectable object may mean an object that is selectable on a displayed user interface. The electronic device 200 may designate, through a user input to a selectable object, a region corresponding to the object, execute an item related to the object, move from the current page to another part related to the object, move to another page related to the object, or execute a function related to the object. For example, the selectable object may include a thumbnail of a video or a title of the video for playing the video in an application that provides a video streaming service, a title of the video, an execution menu of the application, etc.

On the other hand, the non-selectable object may mean a fixed object that is not selectable on the displayed user interface. For example, the non-selectable object may include a description related to video, a reference image, etc., in the application that provides the video streaming service.

For example, when an object can be selected through a user's click gesture, the selectable object may be referred to as a clickable object and the non-selectable object may be referred to as a non-clickable object. However, various embodiments of the disclosure are not limited to the clicking of an object, but may include various manners in which a user can select an object, such as voice commands to a microphone or touch commands on a touch screen.

The electronic device 200 may determine whether one or more objects are text objects or interpretable objects, based on whether the object on the screen includes text information displayed on the text layer 203.

The text object may mean an object including the text information. The interpretable object may mean an object including an image from which text is not extracted, but which is interpretable through metadata, screen recognition based on image processing, etc. The interpretable object may be referred to as a non-text object, an image object, etc.

In operation S530, the electronic device 200 according to an embodiment of the disclosure may generate a data structure to be used in interpretation of a voice command, based on the types of the one or more objects.

According to an embodiment of the disclosure, the electronic device 200 may define and store the data structure including information about the objects in a form that may be searched and arranged. For example, the form of the data structure may include a graph, a lookup table, a linked list, or a tree. For example, the electronic device 200 may generate, in the data structure where the one or more objects form the hierarchical relationship, the data structure in a tree form such that the respective objects and terms related thereto have a horizontal relationship.

An initial data structure generated before reception of the voice command may be generated according to rules defined by the system. The electronic device 200 according to an embodiment of the disclosure may determine a priority of an object, based on the types of the one or more objects. For example, the electronic device 200 may determine priorities of the one or more objects identified on the screen, by using an initial value previously determined according to the type of an object. Alternatively or additionally, for example, the electronic device 200 may classify the one or more objects according to the types of the objects and assign the highest priority to a type of an object that is located at the topmost portion of a screen or is identified first, according to a position of the object on the screen or an order in which the object is identified in operation S510. The electronic device 200 may determine the priorities of the one or more objects identified on the screen, based on the priorities corresponding to the types of the objects.

The electronic device 200 according to an embodiment of the disclosure may generate a data structure indicating a relationship between the one or more objects displayed on the screen and at least one term related to each object. In the generated data structure, objects displayed on the screen may have a hierarchical relationship according to their priorities, and an object and at least one term related to the object may have a horizontal relationship.

The electronic device 200 according to an embodiment of the disclosure may selectively perform a general voice recognition operation or a voice recognition operation newly proposed in the disclosure, based on a user's intent to utter a voice command of the user. The general voice recognition operation may mean interpreting the user's voice command by using a natural language understanding model and a dialog management model that are related to a general function of the electronic device 200. When the general voice recognition operation is performed, the electronic device 200 uses a model that is trained and defined, thus performing defined interpretation with respect to a voice command regardless of whether which screen is displayed, and performing a function responding to the voice command. The voice recognition operation according to an embodiment may include interpreting the user's voice command by selectively performing natural language understanding and dialogue management based on an object displayed on the screen or a function provided by an application executed.

The electronic device 200 according to an embodiment of the disclosure may determine, based on an utterance intent, whether to operate in a first mode in which voice recognition according to an embodiment is performed or in a second mode in which general voice recognition is performed. For example, the electronic device 200 may determine whether to operate in the first mode or in the second mode, based on a type of the utterance intent. In another example, the electronic device 200 may determine whether to operate in the first mode or in the second mode, based on whether an activation word is included in text converted from the user's voice command.

In the first mode, the electronic device 200 according to an embodiment of the disclosure may perform natural language understanding on the text according to a data structure generated based on a type of at least one object displayed on the screen. On the other hand, in the second mode, the electronic device 200 according to an embodiment of the disclosure may perform natural language understanding on the text without using the data structure generated based on the type of the at least one object.

Herein below, with reference to FIG. 6, a description will be made of a method, performed by the electronic device 200 according to an embodiment of the disclosure, of selectively performing the voice recognition operation according to an embodiment of the disclosure.

Figure 6:
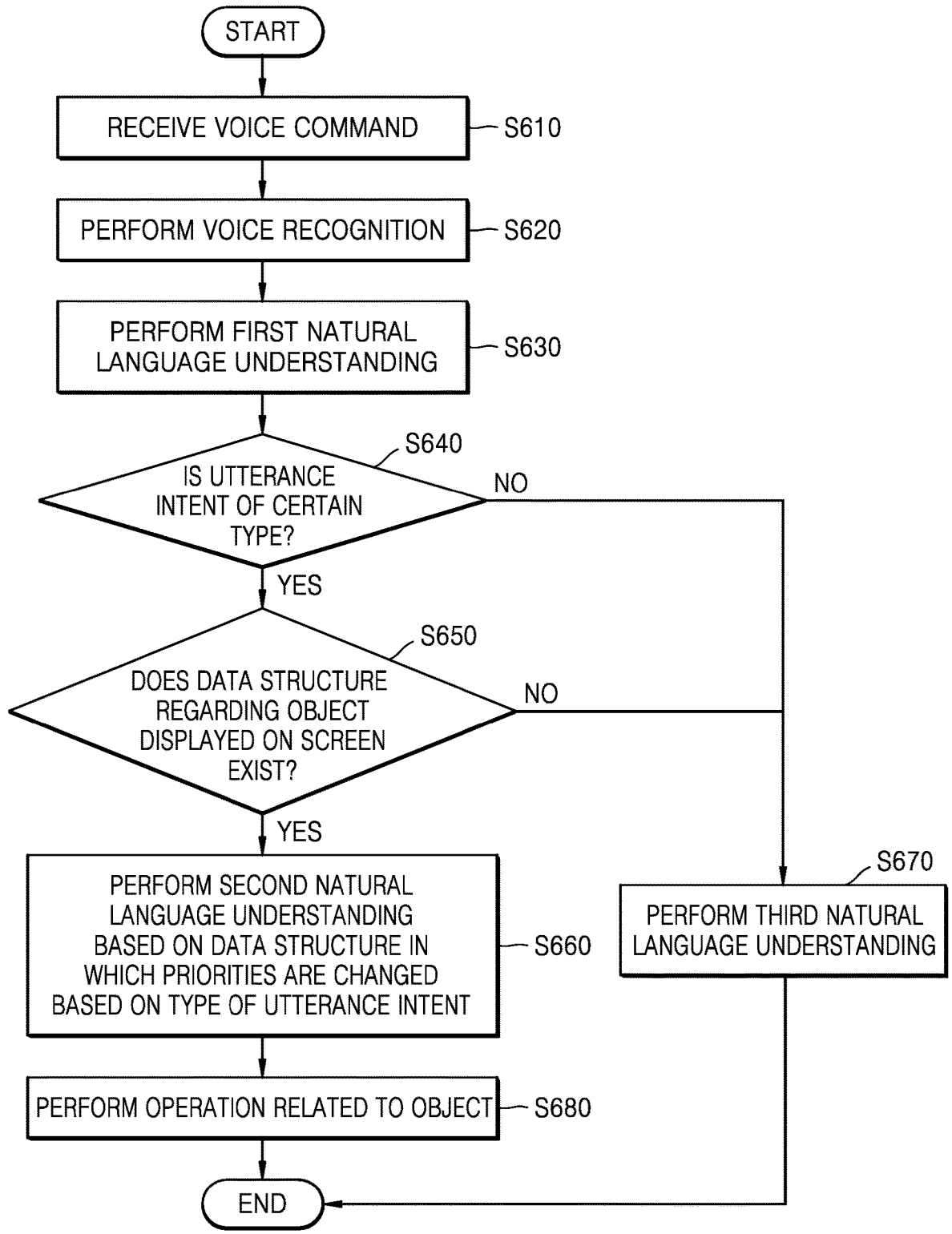
FIG. 6 is a flowchart of a method, performed by an electronic device, of providing a voice recognition service, according to an embodiment of the disclosure.

FIG. 6 is a flowchart of a method, performed by an electronic device, of providing a voice recognition service, according to an embodiment of the disclosure.

The electronic device 200 according to an embodiment of the disclosure may display one or more objects on the screen. For example, the electronic device 200 may display one or more objects provided by an application on the screen by executing the application.

In operation S610, the electronic device 200 according to an embodiment of the disclosure may receive a voice command from a user when the one or more objects are displayed.

In operation S620, the electronic device 200 according to an embodiment of the disclosure may perform voice recognition that converts the received voice command into text.

In operation S630, the electronic device 200 according to an embodiment of the disclosure may determine a user's intent to utter the voice command by performing first natural language understanding on the converted text. The electronic device 200 may determine the user's intent to utter the voice command by analyzing the text through a first natural language understanding model.

The electronic device 200 according to an embodiment of the disclosure may identify the user's intent from the text through the first natural language understanding model and identify at least one entity for performing a certain operation according to the user's intention.

In operation S640, the electronic device 200 according to an embodiment of the disclosure may determine whether the user's utterance intent is of a certain type.

For example, the electronic device 200 may determine whether the utterance intent is of the actionable type or the accessible type.

An actionable utterance may be an utterance for the user to select or execute a function provided by the electronic device 200, and may include a voice command such as "Show", "Play", "Execute", etc. An accessible utterance may be an utterance for the user to access information provided by the electronic device 200, and may include a voice command such as "Read", "Enlarge", etc.

In operation S650, when a type of the user's utterance intent is identified, the electronic device 200 according to an embodiment of the disclosure may determine whether a data structure regarding an object displayed on the screen exists. For example, when the user's utterance intent is of the actionable type or the accessible type, the electronic device 200 may determine whether a data structure related to a display object for use in interpretation of the voice command exists.

In operation S660, when the data structure regarding the object displayed on the screen exists, the electronic device 200 according to an embodiment of the disclosure may operate in the first mode. The electronic device 200 may perform second natural language understanding that interprets the user's voice command based on the object displayed on the screen.

The electronic device 200 according to an embodiment of the disclosure may primarily determine the user's utterance intent through first natural language understanding and perform second natural language understanding based on the type of the utterance intent, thus additionally interpreting the user's voice command. The electronic device 200 may interpret the user's voice command by analyzing objects displayed on the screen, through a second natural language understanding model. The electronic device 200 may perform second natural language understanding to preferentially or selectively recognize or execute a function that is providable on the screen, by using the data structure generated in relation to one or more objects displayed on the screen.

The electronic device 200 according to an embodiment of the disclosure may interpret an intent and an entity that are identified from text converted from the user's voice command, based on the data structure related to the objects displayed on the screen.

The electronic device 200 may determine an order in which the objects displayed on the screen are referred to for interpretation of the intent of the user, through second natural language understanding. The electronic device 200 may re-determine the priorities of the objects of the data structure, based on the type of the utterance intent and the types of the objects. The electronic device 200 may assign different priorities to the types of the objects, according to the type of the utterance intent. For example, the electronic device 200 may perform re-ranking or re-determining of the priorities of the one or more objects of the data structure by using a ranking table.

FIG. 7 shows an example of a priority determined by an electronic device for an object, according to an embodiment of the disclosure.

As shown in FIG. 7, when the type of the utterance intent is the actionable type to select or execute a certain function, the electronic device 200 according to an embodiment of the disclosure may preferentially refer to a selectable object. For example, when the type of the utterance intent is the actionable type, the electronic device 200 according to an embodiment of the disclosure may assign priorities in an order of a selectable text object, a selectable interpretable object, a non-selectable text object, and a non-selectable interpretable object. Numbers shown in the table of FIG. 7 may indicate priorities assigned to the types of the objects. However, embodiments are not limited to the above mentioned order, and may variously assign priorities to the one or more objects.

When a higher priority is assigned to an object in the data structure, it may mean that the electronic device 200 may preferentially refer to that object to interpret the voice command of the user. When an object has a higher priority in the data structure, it may mean that the user's utterance is more likely to be related to that object when the electronic device 200 interprets the voice command of the user.

When the type of the utterance intent is the accessible type to access certain information, the electronic device 200 according to an embodiment of the disclosure may preferentially refer to a text object. When the type of the utterance intent is the accessible type, the electronic device 200 according to an embodiment of the disclosure may assign priorities to a non-selectable text object, a selectable text object, a non-selectable interpretable object, and a selectable interpretable object in that order.

The electronic device 200 according to an embodiment of the disclosure may perform second natural language understanding using the data structure in which the priorities are re-assigned to the one or more objects, based on the type of the utterance intent and the types of the one or more objects. The electronic device 200 may interpret the text converted from the user's voice command, through second natural language understanding that uses the data structure related to the object displayed on the screen.

The electronic device 200 according to an embodiment of the disclosure may interpret an intent and an entity that are identified from the text converted from the user's voice command, based on the data structure related to the objects displayed on the screen. The electronic device 200 may interpret, based on the data structure, that the intent identified from the text is to execute an application function related to the object. The electronic device 200 may interpret, based on the data structure, that the entity identified from the text indicates an object selected from the one or more objects displayed on the screen.

The electronic device 200 according to an embodiment of the disclosure may obtain, as the result of interpreting the text, information about at least one of an utterance intent of the user determined based on the text, the object selected from among the one or more objects displayed on the screen, or a function to be executed in relation to the object selected based on the utterance intent of the user.

Referring back to FIG. 6, in operation S680, the electronic device 200 according to an embodiment of the disclosure may perform an operation related to the object selected from among the one or more objects, based on the result of interpreting the text.

The electronic device 200 according to an embodiment of the disclosure may perform at least one of an operation of playing contents related to the object selected from among the one or more objects displayed on the screen, an operation of enlarging and displaying an image or text related to the selected object, or an operation of converting the text included in the selected object into voice and outputting the voice, based on the result of interpreting the text.

As shown in FIG. 6, when a type of the utterance intent is of a certain type, the electronic device 200 according to an embodiment of the disclosure may perform second natural language understanding to preferentially recognize or execute a function that is providable on the screen, by using the data structure generated in relation to a screen content configuration (e.g., one or more objects displayed on the screen).

On the other hand, when the type of the utterance intent of the user is not of the certain type or data regarding an object displayed on the screen does not exist, the electronic device 200 according to an embodiment of the disclosure may operate in the second mode in operation S670. The electronic device 200 may perform third natural language understanding in the second mode.

The electronic device 200 may perform third natural language understanding on the text converted from the user's voice command, without using the object displayed on the screen. Third natural language understanding may mean natural language understanding through a general natural language understanding model that does not preferentially use the object displayed on the screen. In other words, the third natural language understanding may be performed irrespective of the one or more objects displayed on the screen.

Based on the result of interpreting the text through a third natural language understanding model, the electronic device 200 may perform an operation related to the result of interpretation. For example, the electronic device 200 may generate and output the response message to the result of interpreting the text. The electronic device 200 may output the response message in the form of at least one of voice, text, or video.

Figure 8:
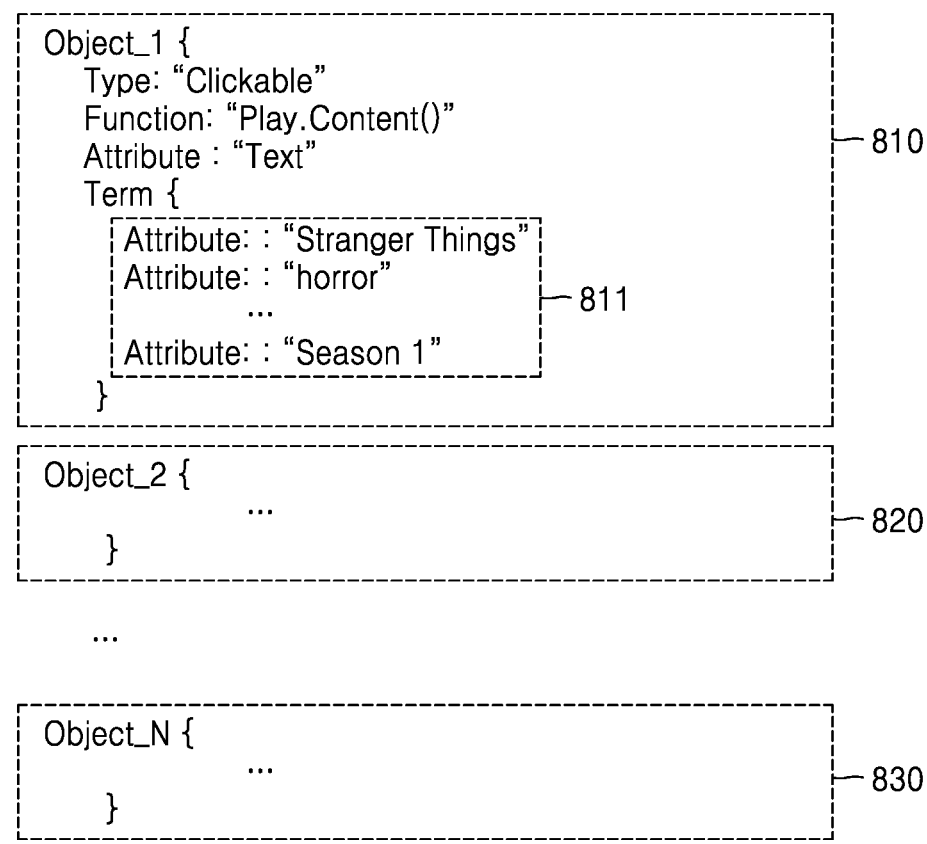
FIG. 8 shows an example of object information used for an electronic device to interpret a voice command, according to an embodiment of the disclosure.

FIG. 8 shows an example of object information used for an electronic device to interpret a voice command, according to an embodiment of the disclosure.

A term related to an object included in the data structure generated by the electronic device 200 according to an embodiment of the disclosure may mean a value or information indicating an attribute of the object.

For example, it is assumed that a video streaming application provides a first object on the screen, in which the first object is a selectable text object for playing a horror TV series titled "Stranger Things". Here, the electronic device 200 may obtain as terms related to the object, text information readable from the first object, "Stranger Things", "Stranger", and "Things", and attribute values from meta data of the first object, "horror", "season 1", and "television series", etc. The electronic device 200 may configure terms of the first object as a list, associate the first object with the list, and store them in the data structure.

The list of a plurality of objects 810, 820, and 830 in the data structure may have a hierarchical relationship according to priorities. Expression of the object may include at least one of a type of the object, an execution function related to the object, or at least one term related to the object. For example, expression 810 of the first object may include a list 811 of information indicating that the type of the first object is a clickable type (Type: Clickable), information indicating that a function executed when the first object is selected is content playback (Function: Play.Content( )), and terms (or attributes) related to the first object (e.g., Stranger Things, horror, Season 1, etc.).

Figure 9A:
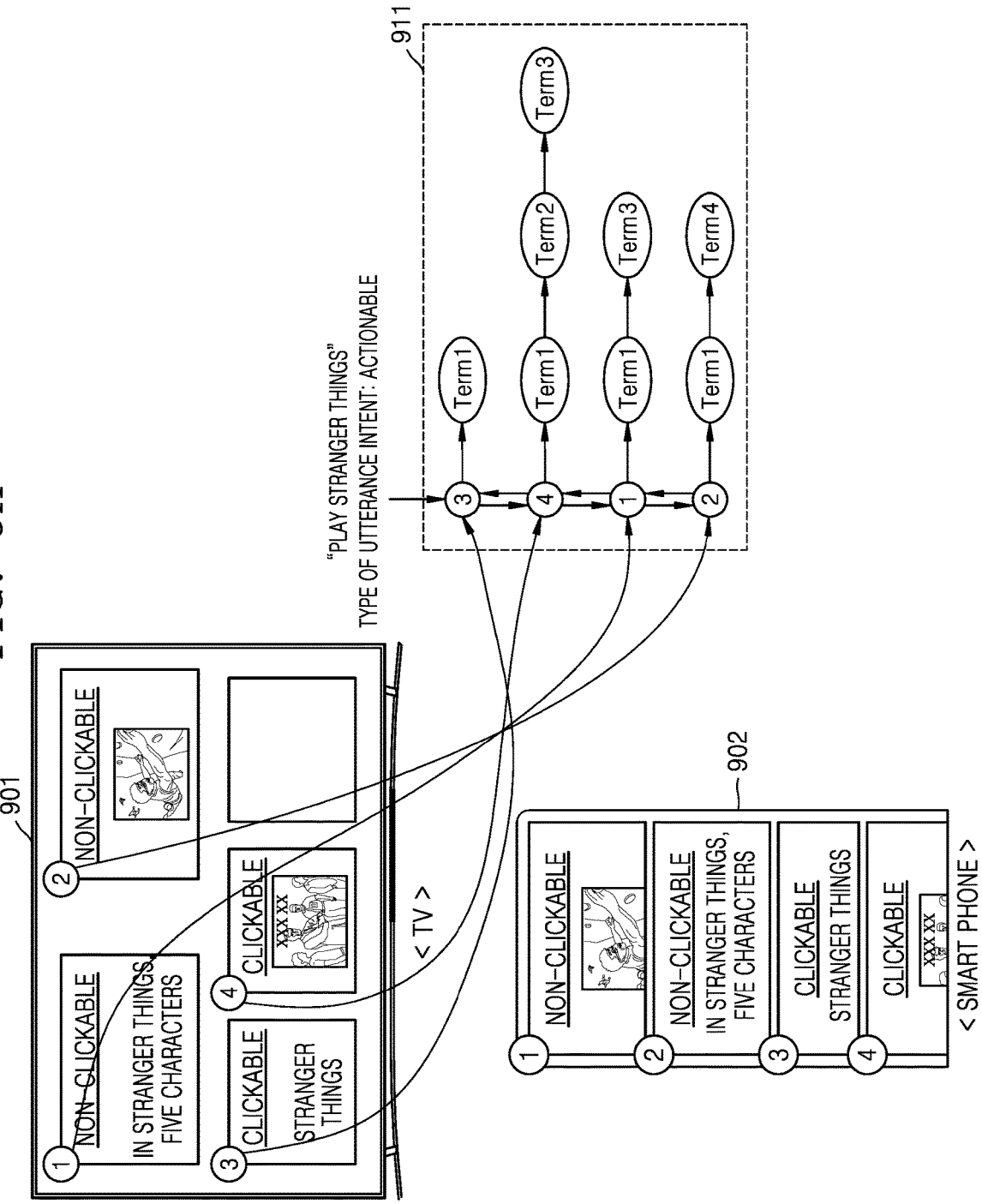
FIG. 9A shows an example in which an electronic device re-determines priorities of a plurality of objects in a data structure based on a user's intent to utter a voice command, according to an embodiment of the disclosure.

FIG. 9A shows an example in which an electronic device re-determines priorities of a plurality of objects in a data structure based on a user's intent to utter a voice command, according to an embodiment of the disclosure.

The electronic device 200 according to an embodiment of the disclosure may generate a data structure related to objects displayed on screens 901 and 902 for interpreting a voice command. The electronic device 200 may configure a hierarchy by using the objects displayed on the screens 901 and 902. The electronic device 200 may associate terms related to the objects with the objects.

As shown in FIG. 9A, based on receipt of the voice command "Play Stranger Things", the electronic device 200 may determine that the type of the utterance intent of the user is the actionable type. The electronic device 200 may identify a priority for each object type corresponding to an actionable utterance on a previously determined re-ranking table, and obtain a data structure 911 in which the priorities of the objects displayed on the screen are re-determined based on identified priorities.

The electronic device 200 according to an embodiment of the disclosure may interpret the user's voice command based on the data structure 911.

The electronic device 200 according to an embodiment of the disclosure may identify an intent from the text converted from the user's voice command, and identify at least one entity used for identification of the utterance intent of the user. The electronic device 200 may compare the identified at least one entity with object information (e.g., a function related to an object, a term related to the object, meta data related to the object, etc.) in the data structure 911. When it is determined that the at least one entity is related to the object information in the data structure 911, the electronic device 200 may use the data structure 911 to interpret the intent identified from the text and the meaning of the at least one entity.

For example, based on receipt of the voice command "Play Stranger Things", the term 'Play' may be identified as the intent and the term 'Stranger Things' may be identified as an entity. In this case, the electronic device 200 may determine that the identified entity "Stranger Things" is associated with an object on an execution screen loaded by a video play application. The electronic device 200 may use a data structure that is generated in advance in relation to objects displayed on the screen to interpret 'Play' based on such determination. Thus, the electronic device 200 may determine that 'Play' instructs to play video, and may call a related API, e.g., an API for playing video related to 'Stranger Things'.

The electronic device 200 may select one of one or more objects displayed on the screen by interpreting the text converted from the user's voice command based on the data structure 911, and interpret the user's voice command as being related to the selected object.

The electronic device 200 according to an embodiment of the disclosure may select an object for playing a clickable object "Stranger Things" based on the data structure 911 in which the priorities are re-determined, and play video corresponding to the selected object, "Stranger Things".

The electronic device 200 according to an embodiment of the disclosure may change the priorities of the objects displayed on the screen, as the type of the utterance intent of the user changes.

Figure 9B:
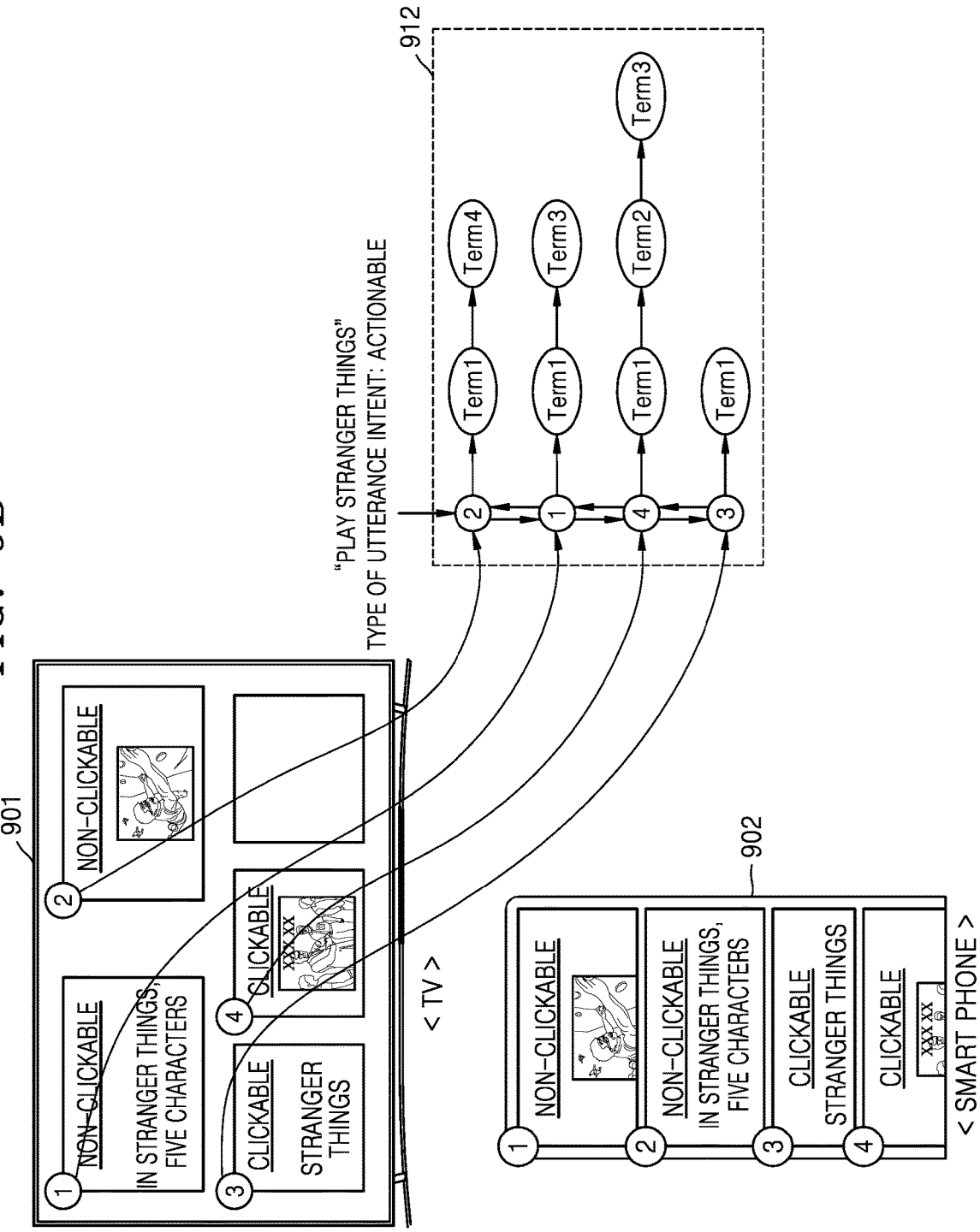
FIG. 9B shows an example in which an electronic device re-determines priorities of a plurality of objects in a data structure based on a user's intent to utter a voice command, according to an embodiment of the disclosure.

FIG. 9B shows an example in which an electronic device re-determines priorities of a plurality of objects in a data structure based on a user's intent to utter a voice command, according to an embodiment of the disclosure.

As shown in FIG. 9B, based on receipt of a voice command "Read Stranger Things", the electronic device 200 may determine that the type of the utterance intent of the user is the accessible type. The electronic device 200 may identify a priority for each object type corresponding to an accessible utterance from a previously determined ranking table, and obtain a data structure 912 in which the priorities of the objects displayed on the screen are re-determined based on the identified priorities.

The electronic device 200 according to an embodiment of the disclosure may select a text object related to "Stranger Things" from among non-clickable objects based on a data structure 912 in which the priorities are re-determined, convert text included in the selected object (e.g., main information or a plot, related to the video "Stranger Things", etc.) into a voice signal, and output the voice signal.

FIG. 10A shows examples of a voice recognition result provided by a general electronic device in response to a user's voice command and a voice recognition result provided by an electronic device according to an embodiment of the disclosure in response to a user's voice command.

FIG. 10A shows a case where the electronic device 200 according to an embodiment of the disclosure receives a voice command of the user 10, "Show me Gone with the Wind" during execution of an application that provides movie contents. A type of an object 1011 displayed on a screen 1010 may be a clickable interpretable type, and a type of an object 1012 may be a non-clickable text type.

A screen 1021 shows a voice recognition result provided to the user 10 according to general natural language understanding. When the user 10 often plays music titled "Gone with the Wind" through a music play application, the electronic device 200 may have learned to interpret the utterance "Gone with the Wind" as a music title.

On the other hand, a screen 1022 shows a voice recognition result provided to the user 10 according to natural language understanding according to an embodiment of the disclosure. The electronic device 200 according to an embodiment of the disclosure may perform natural language understanding to preferentially recognize or execute a function that is providable on the screen, by analyzing the objects 1011 and 1012 displayed on the screen. The electronic device 200 according to an embodiment of the disclosure may identify the entity "Gone with the Wind" from the text converted from the voice command, and compare the identified entity with the objects 1011 and 1012 displayed on the screen. When it is determined that the identified entity is related to the objects 1011 and 1012 displayed on the screen, the electronic device 200 may use a data structure related to the objects 1011 and 1012 in interpretation of the meaning of the identified entity.

The electronic device 200 according to an embodiment of the disclosure may interpret "Gone with the Wind" of the voice command of the user as a movie title related to the clickable object 1011. Thus, as shown in FIG. 10A, in response to the voice command of the user, the movie "Gone with the Wind" related to the object 1011 displayed on the screen may be played.

Figure 10B:
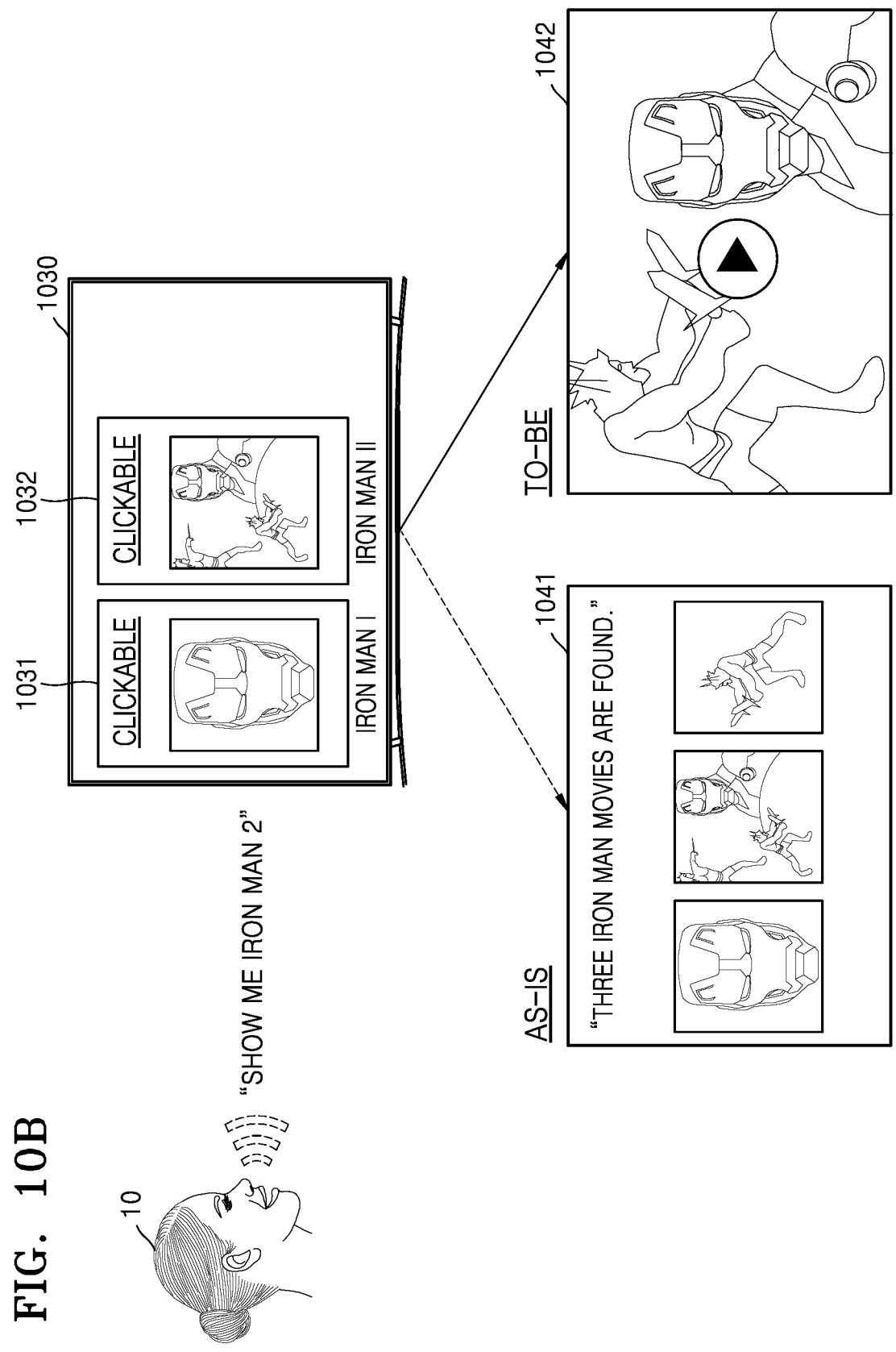
FIG. 10B shows examples of a voice recognition result provided by a general electronic device in response to a user's voice command, and a voice recognition result provided by an electronic device according to an embodiment of the disclosure in response to a user's voice command.

FIG. 10B shows examples of a voice recognition result provided by a general electronic device in response to a user's voice command and a voice recognition result provided by an electronic device according to an embodiment of the disclosure in response to a user's voice command.

FIG. 10B shows a case where the electronic device 200 according to an embodiment of the disclosure receives a voice command of the user 10, "Show me Iron Man 2" during execution of an application that provides movie contents. A type of an object 1031 displayed on a screen 1030 is a clickable text type, and a type of an object 1032 is also a clickable text type.

A screen 1041 shows a voice recognition result provided to the user 10 according to general natural language understanding. According to general natural language understanding, "Show me A" may be interpreted as an intent to search for A. In this case, the electronic device 200 may interpret the user's utterance intent "Show me Iron Man 2" as searching for Iron Man series. Thus, as shown on the screen 1041, a result of searching for the Iron Man series may be displayed on the screen 1041.

On the other hand, a screen 1042 shows a voice recognition result provided to the user 10 according to natural language understanding proposed in the disclosure. The electronic device 200 according to an embodiment of the disclosure may perform natural language understanding to preferentially recognize or execute a function that is providable on the screen, by analyzing the objects 1031 and 1032 displayed on the screen 1030. The electronic device 200 according to an embodiment of the disclosure may interpret the user's voice command "Show me Iron Man 2" as a request for playing a movie related to the clickable object 1032. Thus, as shown in FIG. 10B, in response to the voice command of the user, the movie "Iron Man 2" related to the object 1032 may be played.

FIG. 11 shows examples of a voice recognition result provided by a general electronic device in response to a user's voice command and a voice recognition result provided by an electronic device according to an embodiment of the disclosure.

The electronic device 200 according to an embodiment of the disclosure may be controlled by the user's voice command including position information on the screen. To identify one or more objects displayed on the screen related to the user's voice command, the electronic device 200 according to an embodiment of the disclosure may obtain position information based on the user's voice command and provide a voice recognition service based on position information of a displayed object.

FIG. 11 is an example in which the electronic device 200 according to an embodiment of the disclosure receives a voice command of the user 10, "Show me the rightmost movie" or "Play the movie displayed to the left of the current cursor" during execution of an application that provides movie contents. A type of an object 1111 displayed on a screen 1110 may be a clickable interpretable type.

A screen 1121 shows a voice recognition result provided to the user 10 according to general natural language understanding. A general electronic device 20 may not be able to interpret the meaning of an entity "rightmost" or "left of the current cursor" indicating positional relationship information of the one or more objects on the screen from the text obtained from the user's voice command. The general electronic device 20 may output a response message indicating that interpretation of the voice command is not understood, and thus not performed, as shown on the screen 1211.

On the other hand, a screen 1122 shows a voice recognition result provided to the user 10 according to natural language understanding proposed in the disclosure. The electronic device 200 according to an embodiment of the disclosure may perform natural language understanding to preferentially recognize or execute a function that is providable on the screen, by analyzing positional relationship information of the objects displayed on the screen 1110.

The electronic device 200 according to an embodiment of the disclosure may interpret the meaning of an entity "the rightmost" or "the left of the current cursor" indicating positional relationship information on the screen from the text obtained from the user's voice command, by analyzing the positional relationship information of the objects displayed on the screen 1110. The electronic device 200 according to an embodiment of the disclosure may interpret that the entity "rightmost" or "left of the current cursor" indicates the clickable object 1111, based on the positional relationship information of the objects. The electronic device 200 may interpret the user's voice command as the request for playing the movie related to the clickable object 1111. Thus, as shown in FIG. 11, in response to the voice command of the user, the movie related to the object 1111 may be played.

As described above, the electronic device 200 according to an embodiment of the disclosure may improve the accuracy of voice recognition with respect to the voice command of the user related to the displayed screen by interpreting the text converted from the user's voice command, based on a data structure related to objects displayed on the screen.

Herein below, components of the electronic device 200 that provides a voice recognition service according to an embodiment of the disclosure will be described. Each component of the electronic device 200 described below may perform each operation of an operating method of the electronic device 200. Thus, matters overlapping with the foregoing description will be omitted.

Figure 12A:
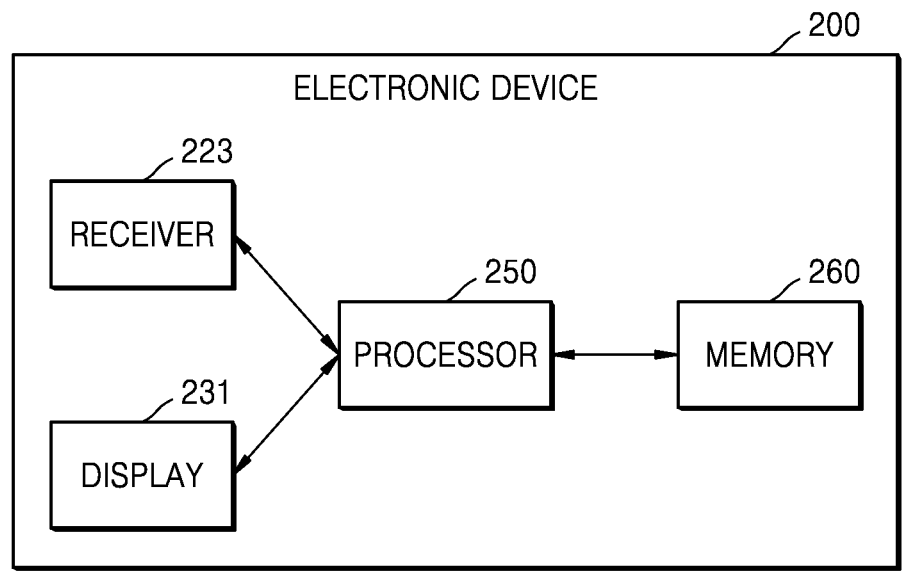
FIG. 12A is a block diagram of an electronic device according to an embodiment of the disclosure.

FIG. 12A is a block diagram of an electronic device according to an embodiment of the disclosure.

The electronic device 200 according to an embodiment of the disclosure may be a fixed terminal or a mobile terminal implemented with a computer device. The electronic device 200 may be, for example, but not limited to, at least one of a TV, a smart phone, a navigation device, a computer, a laptop, a digital broadcasting terminal, an artificial intelligence speaker, a PDA, a PMP, or a tablet PC. The electronic device 200 may communicate with another device and/or a server through a network by using a wireless or wired communication scheme.

Figure 12B:
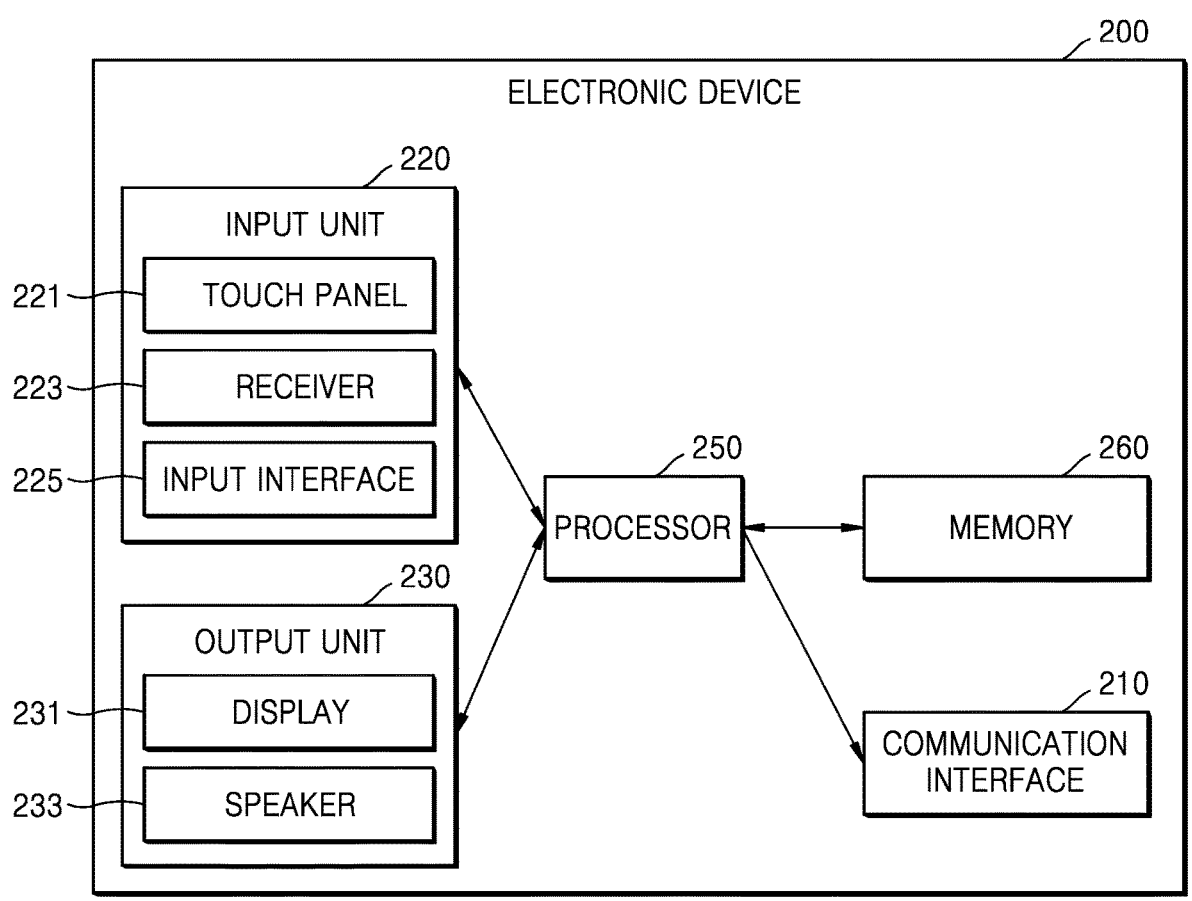
FIG. 12B is a block diagram of an electronic device according to an embodiment of the disclosure.

Referring to FIG. 12A, the electronic device 200 may include a receiver 223, a display 231, a processor 250, and a memory 260. According to various embodiments, some of the components shown in FIG. 12A may not be included in the electronic device 200. Also, more components than those shown in FIG. 12A may be used to implement the electronic device 200. For example, as shown in FIG. 12B, the electronic device 200 according to an embodiment of the disclosure may further include an input unit 220, an output unit 230, and a communication interface 210. At least one component shown in FIGS. 12A and 12B may perform operations of FIGS. 4 through 6. Thus, a description overlapping with the foregoing description made with reference to FIGS. 4 through 6 will be omitted.

The receiver 223 according to an embodiment of the disclosure may receive a voice command from the user. For example, the receiver 223 may receive the voice command by converting an external sound into electrical acoustic data through a microphone. Although the receiver 223 shown in FIG. 12A is included in the electronic device 200, the receiver 223 may be included in a separate device and may be wiredly or wirelessly connected with the electronic device 200 according to another embodiment of the disclosure. For example, the receiver 223 may include a microphone configured to detect or receive one or more audio signals.

The display 231 according to an embodiment of the disclosure may display information processed by the electronic device 200. For example, the display 231 may display an icon for executing an application installed in the electronic device 200, display screen contents provided from an application executed, or a user interface (UI) or a graphic user interface (GUI) related to control of the electronic device 200. For example, the display 231 may display a screen including one or more objects.

When the display 231 and a touch pad are constructed as a touch screen in a layer structure, the display 231 may be used as an input device as well as an output device. The display 231 may include at least one of a liquid crystal display (LCD), a thin film transistor (TFT) LCD, an organic light-emitting diode (OLED), a flexible display, a three-dimensional (3D) display, or an electrophoretic display. According to implementation types of the electronic device 200, the electronic device 200 may include two or more displays 231. According to another embodiment of the disclosure, the display 231 may be included in a separate device and may be wiredly or wirelessly connected with the electronic device 200.

The memory 260 according to an embodiment of the disclosure may store instructions for providing the voice recognition service, various models used for voice recognition, a data structure, a neural network, dictionary information, etc.

The processor 250 according to an embodiment of the disclosure may control the electronic device 200 to provide the voice recognition service according to various embodiments of the disclosure, by executing one or more instructions stored in the memory 260. While it is shown in FIG. 12A that the electronic device 200 includes one processor 250, the disclosure is not limited to the shown embodiment of the disclosure. The electronic device 200 may include a plurality of processors. When the electronic device 200 includes a plurality of processors, operations and functions of the processor 250 may be partially performed in a plurality of processes.

The processor 250 according to an embodiment of the disclosure may receive a voice command of the user through the receiver 223 when one or more objects are displayed on the screen of the display 231. Based on receipt of the voice command, the processor 250 may identify the one or more objects displayed on the screen and interpret the text converted from the voice command, based on types of the one or more objects. The processor 250 may perform an operation related to an object selected from among the one or more objects, based on a result of interpreting the text. The types of the one or more objects may be identified according to whether a corresponding object is selectable by a user input to the electronic device 200. Herein below, the operations of the processor 250 will be described in more detail.

The processor 250 may display the one or more objects on the screen of the display 231 and generate a data structure related to the one or more objects for use in interpretation of the voice command. The processor 250 according to an embodiment of the disclosure may identify the types of the one or more objects, based on character recognition (e.g., OCR) through image processing with respect to the one or more objects or through meta data reading with respect to an application that provides the one or more objects.

For example, the processor 250 may identify the types of the one or more objects, based on whether the one or more objects are selectable or non-selectable by a user input to the electronic device 200 or whether the one or more objects include or do not include text information.

The processor 250 according to an embodiment of the disclosure may determine priorities of the one or more objects based on the types of the one or more objects, and generate a data structure in a tree form indicating a relationship between the one or more objects and terms related thereto. To the data structure related to the object, generated for use in interpretation of the voice command, the description made with reference to FIGS. 7, 8, 9A, and 9B may be applied. A detailed description will be omitted.

When a certain condition is satisfied, the processor 250 according to an embodiment of the disclosure may operate to preferentially recognize or execute a function that is providable on the screen, by using the data structure generated in relation to a screen content configuration (e.g., one or more objects displayed on the screen).

For example, the processor 250 may convert the voice command into the text and determine a type of the utterance intent of the user from the text. The processor 250 may determine the type of the utterance intent of the user by primarily interpreting the text through first natural language understanding. The processor 250 may determine whether to operate in the first mode or in the second mode, based on a type of the utterance intent. For example, the electronic device 200 may operate in the first mode when the type of the utterance intent is determined as a certain type (e.g., the actionable type or the accessible type), and may operate in the second mode when the type of the utterance intent is not the certain type.

In another example, the processor 250 may obtain the text from the voice command and determine whether the text includes an activation word. The processor 250 may determine whether to operate in the first mode or in the second mode, based on whether the activation word is included in the text converted from the voice command. For example, the electronic device 200 may operate in the second mode when the text includes the activation word, and may operate in the first mode when the text does not include the activation word.

For example, when "Hi, Bixby" is used as the activation word, the electronic device 200 may execute a 'video streaming application' in response to a user's voice command "Hi, Bixby. Execute the video streaming application". During execution of the 'video streaming application', the electronic device 200 may be in a standby state of a contextual dialogue of the user. When the user calls "Hi, Bixby" in the standby state, the electronic device 200 may operate in the second mode, and when the user utters "Play Stranger Things" without an activation word, the electronic device 200 may operate in the first mode.

In another example, when the type of the utterance intent is a certain type (e.g., the actionable type or the accessible type) and a data structure regarding an object displayed on the screen exists, the processor 250 may determine to operate in the first mode. When the data structure regarding the object displayed on the screen does not exist although the type of the utterance intent is a certain type, the processor 250 may determine to operate in the second mode.

In the first mode, the electronic device 200 may perform natural language understanding on the text by using the data structure generated based on the types of the one or more objects displayed on the screen. On the other hand, in the second mode, the electronic device 200 may perform natural language understanding on the text without using the data structure generated based on the types of the one or more objects.

When the processor 250 determines to operate in the first mode, the processor 250 may identify the one or more objects displayed on the screen based on the received voice command. More specifically, the electronic device 250 according to an embodiment of the disclosure may re-determine the priorities of the one or more objects of the data structure, based on the type of the utterance intent and the types of the one or more objects.

The processor 250 according to an embodiment of the disclosure may assign different priorities to the types of the one or more objects according to the type of the utterance intent of the user. For example, the electronic device 200 may perform re-ranking to re-determine the priorities of the one or more objects of the data structure by using a ranking table.

The processor 250 according to an embodiment of the disclosure may perform natural language understanding using the data structure in which the priorities are re-assigned to the one or more objects, based on the type of the utterance intent and the types of the one or more objects. The processor 250 may interpret text based on a data structure related to an object displayed on the screen.

The processor 250 according to an embodiment of the disclosure may perform an operation related to an object selected from among the one or more objects, based on a result of interpreting the text.

The processor 250 according to an embodiment of the disclosure may obtain, as the result of interpreting the text, information about at least one of an utterance intent of the user determined based on the text, the object selected from among the one or more objects displayed on the screen, or a function to be executed in relation to the object selected based on the utterance intent of the user.

The processor 250 according to an embodiment of the disclosure may perform at least one of an operation of playing contents (e.g., audio, video, etc.) related to the object selected from among the one or more objects displayed on the screen, an operation of enlarging and displaying an image or text related to the selected object, or an operation of converting the text included in the selected object into voice and outputting the voice, based on the result of interpreting the text.

The electronic device 200 may be implemented with more components than those shown in FIG. 12A. For example, as shown in FIG. 12B, the electronic device 200 according to an embodiment of the disclosure may further include an input unit 220, an output unit 230, and a communication interface 210.

FIG. 12B is a block diagram of an electronic device according to an embodiment of the disclosure.

The input unit 220 may receive a user input to the electronic device 200. For example, the input unit 220 may include the touch panel 221 that receives a user's touch, the receiver 223 that receives a voice command, or an input interface 225. The input unit 220 may receive an input of settings related to a voice recognition service or receive a control command from the user.

The receiver 223 may receive the user's voice command. For example, the receiver 223 may directly receive the voice command by converting an external sound into electrical acoustic data through a microphone. The receiver 223 may receive the voice command transmitted from an external device.

The input interface 225 may include a button for receiving push manipulation of the user, a wheel for receiving rotation manipulation of the user, a keyboard, or/and a dome switch, etc.

The output unit 230 may output information processed or stored in the electronic device 200. For example, the output unit 230 may include a display 231 capable of outputting an image signal. Alternatively, the output unit 230 may include a speaker 233 capable of outputting an audio signal.

The communication interface 210 may include one or more components connected to a network that enable the electronic device 200 to communicate with another device or a server. For example, the communication unit 210 may include a short-range communication module, a wired communication module, a mobile communication module, etc.

The processor 250 according to an embodiment of the disclosure may output a response message through the speaker 233 or transmit information related to a result of interpreting the voice command of the user through the communication interface 210, based on the result of interpreting the user's voice command in consideration of the one or more objects displayed on the screen.

Moreover, a system for providing a voice recognition service according to an embodiment of the disclosure may include at least one electronic device and a server, and some or all of the above-described operations of the electronic device 200 may be performed in the server connected with the electronic device 200.

Figure 13:
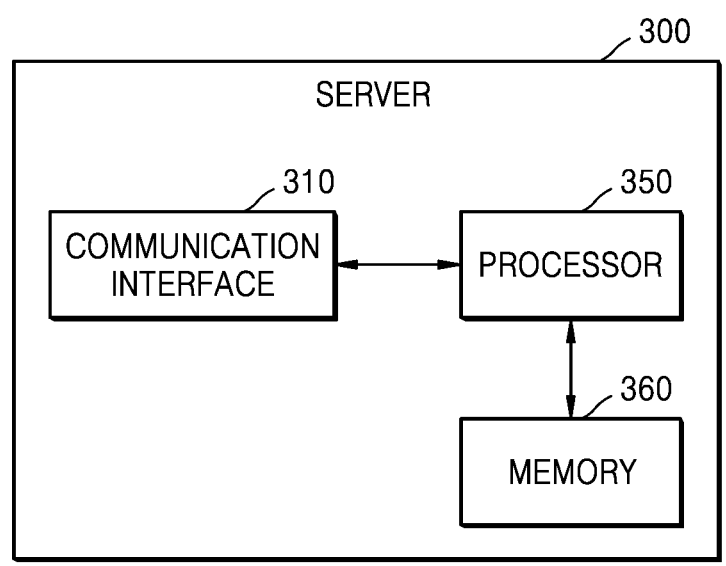
FIG. 13 is a block diagram of a server according to an embodiment of the disclosure.

FIG. 13 is a block diagram of a server according to an embodiment of the disclosure.

Referring to FIG. 13, a server 300 according to an embodiment of the disclosure may include a communication interface 310, a memory 360, and a processor 350. However, the server 300 may be implemented with more components than those shown in FIG. 13.

The communication interface 310 according to an embodiment of the disclosure may receive information about a voice command of the user from an external electronic device. The "information related to the voice command" may include an audio signal including the voice command or include a feature vector extracted from the voice command or text converted from the voice command.

The server 300 according to an embodiment of the disclosure may interpret the voice command of the user 10, based on at least one object displayed on the screen of the electronic device 200 and the information related to the voice command received from the electronic device 200.

The memory 360 according to an embodiment of the disclosure may store instructions for providing the voice recognition service, various models used for voice recognition, a data structure, a neural network, or dictionary information, etc.

The processor 350 according to an embodiment of the disclosure may control the server 300 to provide the voice recognition service according to various embodiments of the disclosure, by executing one or more instructions stored in the memory 360. While it is shown in FIG. 13 that the server 300 includes one processor 350, embodiments are not limited thereto. The server 300 may include a plurality of processors. When the server 300 includes a plurality of processors, operations and functions of the processor 350 may be partially performed in each of a plurality of processors.

The processor 350 may generate a data structure related to one or more objects displayed on the screen of the electronic device 200 for use in interpretation of the voice command. The processor 350 according to an embodiment of the disclosure may identify the types of the one or more objects, based on character recognition through image processing with respect to the one or more objects or through meta data reading with respect to an application that provides the one or more objects.

For example, the processor 350 may identify the types of the one or more objects, based on whether the one or more objects are selectable or non-selectable by a user input to the electronic device 200 or whether the one or more objects include or do not include text information.

The processor 350 according to an embodiment of the disclosure may determine priorities of the one or more objects based on the types of the one or more objects, and generate a data structure indicating a relationship between the one or more objects and terms related thereto.

The processor 350 according to an embodiment of the disclosure may receive information related to the voice command of the user received during display of one or more objects on the screen of the electronic device 200.

The processor 350 may identify the one or more objects displayed on the screen and interpret the text converted from the voice command, based on the types of the one or more objects.

The processor 350 according to an embodiment of the disclosure may assign different priorities to the types of the one or more objects according to the type of the utterance intent of the user. For example, the server 300 may perform re-ranking to re-determine the priorities of the one or more objects of the data structure by using a ranking table.

The processor 350 according to an embodiment of the disclosure may perform natural language understanding using the data structure in which priorities are re-assigned to the one or more objects, based on the type of the utterance intent and the types of the one or more objects. The processor 350 may interpret text based on a data structure related to an object displayed on the screen.

The processor 350 according to an embodiment of the disclosure may consider, as the result of interpreting the text, information about at least one of an utterance intent of the user determined based on the text, the object selected from among the one or more objects displayed on the screen, or a function to be executed in relation to the object selected based on the utterance intent of the user.

The server 300 may control the electronic device 200 to perform the certain operation or output the response message, by transmitting a result of interpreting the text to the electronic device 200.

The processor 350 according to an embodiment of the disclosure may control the electronic device 200 to perform at least one of an operation of playing contents (e.g., audio, video, etc.) related to the object selected on the screen of the electronic device 200, an operation of enlarging and displaying an image or text related to the selected object, or an operation of converting the text included in the selected object into voice and outputting the voice, based on the result of interpreting the text.

A voice recognition method according to the disclosure may be performed by a processor and a memory based on artificial intelligence (AI) technology. The processor may include one or more processors. The one or more processors may include a general-purpose processor such as a CPU, an application processor (AP), a digital signal processor (DSP), etc., a graphic-dedicated processor such as a GPU, a vision processing unit (VPU), etc., or an AI-dedicated processor such as a neural processing unit (NPU). The one or more processors may control data to be processed according to a predefined operation rule or AI model stored in the memory. When the one or more processors include an AI-dedicated processor, the AI-dedicated processor may be designed to have a hardware structure specialized for processing a specific AI model.

The predefined operation rule or AI model may be made through training. When the AI model is made through training, it may mean that a basic AI model is trained based on a learning algorithm by using multiple training data, such that the predefined operation rule or AI model set to execute desired characteristics is generated. Such training may be performed by a device on which AI according to the disclosure is implemented, or by a separate server and/or system. Examples of a learning algorithm may include, but not limited to, supervised learning, unsupervised learning, semi-supervised learning, or reinforcement learning.

The AI model may include a plurality of neural network layers. Each of the plurality of neural network layers may have a plurality of weight values, and perform a neural network operation through an operation between an operation result of a previous layer and the plurality of weight values. The plurality of weight values of the plurality of neural network layers may be optimized by a training result of the AI model. For example, the plurality of weight values may be updated to reduce or minimize a loss value or a cost value obtained in the AI model during a training process. Examples of the AI neural network may include, but not limited to, a deep neural network (DNN), a convolutional neural network (CNN), a recurrent neural network (RNN), a restricted Boltzmann machine (RBM), a deep belief network (DBN), a bidirectional recurrent deep neural network (BRDNN), or a deep Q-network.

In addition, disclosed embodiments of the disclosure may be implemented as a software (S/W) program including an instruction stored in computer-readable storage medium.

The computer may invoke stored instructions from the storage medium and operate based on the invoked instructions according to the disclosed embodiment of the disclosure, and may include an electronic device and a server according to the disclosed embodiments of the disclosure.

The computer-readable storage medium may be provided in the form of a non-transitory storage medium. The term "non-transitory" means that the storage medium is a tangible device, and does not include a signal (e.g., an electromagnetic wave), but this term does not differentiate between where data is semi-permanently stored in the storage medium or where the data is temporarily stored in the storage medium.

The electronic device or the operation method according to the embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the electronic device or an electronic market (e.g., Google Play Store or App Store). For the electronic distribution, at least a portion of the S/W program may be stored in a storage medium or temporarily generated. In this case, the storage medium may be a storage medium of a server in the manufacturer, the electronic market, or a relay server that temporarily stores the S/W program.

The computer program product may include a storage medium of a server or a storage medium of a terminal (e.g., an apparatus or device for providing a voice recognition service), in a system including the server and the terminal. Alternatively or additionally, when there is a third device (e.g., a smart phone) communicating with the server or the terminal, the computer program product may include a storage medium of the third device. Alternatively or additionally, the computer program product may include a S/W program itself, which is transmitted from the server to the terminal or the third device or transmitted from the third device to the terminal.

In this case, one of the server, the terminal, and the third device may execute the computer program product to perform the operation method according to the embodiments of the disclosure. Alternatively or additionally, two or more of the server, the terminal, and the third device may execute the computer program product to execute the operation method according to the embodiments of the disclosure in a distributed manner.

For example, a server (e.g., a cloud server or an AI server, etc.) may execute a computer program product stored in the server to control the terminal communicating with the server to perform the operation method according to the embodiments of the disclosure.

In another example, the third device may execute the computer program product to control the terminal communicated with the third device to perform the operation method according the disclosed embodiment of the disclosure.

When the third device executes the computer program product, the third device may download the computer program product and execute the downloaded computer program product. Alternatively or additionally, the third device may execute a computer program product provided in a preloaded state to execute the operation method according to the disclosed embodiments of the disclosure.

Some of the embodiments of the disclosure have been shown and described above. However, the one or more embodiments of the disclosure are not limited to the aforementioned specific embodiments. It may be understood that various modifications, substitutions, improvements and equivalents thereof can be made without departing from the spirt and scope of the disclosure. It should be understood that such modifications, substitutions, improvements and equivalents thereof shall fall within the protection scope of the disclosure, and should not to be construed independent from the inventive concept or prospect of the disclosure.

What is claimed is:

1. A method, performed by an electronic device, of providing a voice recognition service, the method comprising:

receiving a voice command of a user while one or more objects are displayed on a screen of the electronic device;

based on the receiving the voice command, identifying the one or more objects displayed on the screen;

obtaining text from the voice command;

determining, from the text obtained from the voice command, a type of an utterance intent of the user as actionable or accessible, or not actionable or accessible;

identifying types of the one or more objects as text or interpretable, and as selectable or non-selectable by a user input to the electronic device;

based on the type of the utterance intent being actionable or accessible, interpreting the text obtained from the voice command in a first mode by performing natural language understanding with respect to the text based on a data structure generated based on the types of the one or more objects displayed on the screen, and by:

based on the type of the utterance intent being actionable, preferentially referring to the one or more objects that are selectable; and based on the type of the utterance intent being accessible, preferentially referring to the one or more objects that are text;

selecting a selectable object from the one or more objects displayed on the screen, based on a result of the interpreting of the text;

performing an operation related to a selected object;

receiving a second voice command of the user while the one or more objects are displayed on the screen of the electronic device;

based on the receiving the second voice command, identifying the one or more objects displayed on the screen;

obtaining text from the second voice command;

determining, from the text obtained from the second voice command, the type of the utterance intent of the user as actionable or accessible, or not actionable or accessible;

identifying types of the one or more objects as text or interpretable, and as selectable or non-selectable by a user input to the electronic device;

based on the type of the utterance intent being not actionable or not accessible, interpreting the text obtained from the second voice command in a second mode by performing the natural language understanding on the text without using the data structure generated based on the types of the one or more objects; and generating a response message in a form of at least one of voice, text, or video, to the result of interpreting the text from the second voice command.

2. The method of claim 1, further comprising:

generating the data structure by:

identifying the types of the one or more objects through character recognition based on image processing with respect to the one or more objects or through meta data reading with respect to an application that provides the one or more objects;

determining priorities of the one or more objects, based on the types of the one or more objects; and generating the data structure in a tree form indicating a relationship between the one or more objects and terms related to the one or more objects.

3. The method of claim 2, wherein the terms related to the one or more objects are obtained from at least one of text information included in the one or more objects or attribute information of the one or more objects included in the meta data of the application that provides the one or more objects.

4. The method of claim 2, wherein the one or more objects comprise at least one of image information or text information, the image information is displayed on an object layer of the screen, the text information is displayed on a text layer of the screen, and the types of the one or more objects are identified based on the object layer and the text layer.

5. The method of claim 2, wherein the identifying the types of the one or more objects further comprises identifying whether the one or more objects include text information.

6. The method of claim 1, further comprising:

generating the data structure, wherein the identifying the one or more objects displayed on the screen comprises:

determining priorities of the one or more objects of the data structure, based on the type of the utterance intent and the types of the one or more objects.

7. The method of claim 1, wherein the determining whether to operate in the first mode or in the second mode is also based on whether an activation word is included in the text.

8. The method of claim 1, wherein the result of the interpreting the text comprises information about at least one of the utterance intent of the user, the selected object, or a function to be executed by the electronic device in relation to the selected object.

9. The method of claim 1, wherein the operation related to the selected object comprises at least one of playing a video related to the selected object, enlarging and displaying an image or text related to the selected object, or outputting an audio based on the text included in the selected object.

10. The method of claim 1, wherein the performing the operation related to the selected object comprises generating and outputting the response message related to the selected object, based on the voice command of the user.

11. An electronic device for providing a voice recognition service, the electronic device comprising:

a display;

a microphone;

a memory storing one or more instructions; and at least one processor configured to execute one or more instructions stored in the memory to:

receive a voice command of a user via the microphone while one or more objects are displayed on a screen of the display;

based on receipt of the voice command, identify the one or more objects displayed on the screen;

obtain text from the voice command;

determine, from the text obtained from the voice command, a type of an utterance intent of the user as (i) actionable or accessible or (ii) not actionable or not accessible;

identify types of the one or more objects as text or interpretable, and as selectable or non-selectable by a user input to the electronic device;

based on the type of the utterance intent being actionable or accessible, interpret the text obtained from the voice command in a first mode by performing natural language understanding with respect to the text based on a data structure generated based on the types of the one or more objects displayed on the screen, and by:

based on the type of the utterance intent being actionable, preferentially referring to the one or more objects that are selectable; and based on the type of the utterance intent being accessible, preferentially referring to the one or more objects that are text;

based on the type of the utterance intent being not actionable or not accessible, interpret the text obtained from the voice command in a second mode by performing the natural language understanding on the text without using the data structure generated based on the types of the one or more objects;

select a selectable object from the one or more objects displayed on the screen, based on a result of the interpreting of the text; and perform an operation related to a selected object.

12. The electronic device of claim 11, wherein the at least one processor is further configured to execute the one or more instructions to:

generate the data structure;

identify the types of the one or more objects through character recognition based on image processing with respect to the one or more objects or through meta data reading with respect to an application that provides the one or more objects; and determine priorities of the one or more objects, based on the types of the one or more objects, to generate the data structure in a tree form indicating a relationship between the one or more objects and terms related to the one or more objects.

13. A server for providing a voice recognition service through an electronic device comprising a display, the server comprising:

a communication interface configured to communicate with the electronic device;

a memory storing one or more instructions; and at least one processor configured to execute one or more instructions stored in the memory to:

receive information about a voice command of a user received through the electronic device while one or more objects are displayed on a screen of the electronic device;

identify the one or more objects displayed on the screen, based on receipt of the voice command;

obtain text from the voice command;

determine, from the text obtained from the voice command, a type of an utterance intent of the user as actionable or accessible;

identify types of the one or more objects as text or interpretable, and as selectable or non-selectable by a user input to the electronic device;

based on the type of the utterance intent being actionable or accessible, interpret the text obtained from the voice command in a first mode by performing natural language understanding with respect to the text based on a data structure generated based on the types of the one or more objects displayed on the screen, and by:

based on the type of the utterance intent being actionable, preferentially referring to the one or more objects that are selectable; and based on the type of the utterance intent being accessible, preferentially referring to the one or more objects that are text;

based on the type of the utterance intent being not actionable or not accessible, interpret the text obtained from the voice command in a second mode by performing the natural language understanding on the text without using the data structure generated based on the types of the one or more objects;

select a selectable object from the one or more objects displayed on the screen, based on a result of the interpreting of the text; and control the electronic device to perform an operation related to a selected object.

* * * * *